(12) United States Patent
Barger et al.

(10) Patent No.: US 8,320,217 B1
(45) Date of Patent: Nov. 27, 2012

(54) SYSTEMS AND METHODS FOR DISAMBIGUATING SHOOTER LOCATIONS WITH SHOCKWAVE-ONLY LOCATION

(75) Inventors: James Edwin Barger, Winchester, MA (US); Richard James Mullen, Needham, MA (US); Daniel Ramsay Cruthirds, Cambridge, MA (US); Ronald Bruce Coleman, Arlington, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 449 days.

(21) Appl. No.: 12/629,761

(22) Filed: Dec. 2, 2009

Related U.S. Application Data

(60) Provisional application No. 61/247,921, filed on Oct. 1, 2009.

(51) Int. Cl.
*G01S 3/80* (2006.01)

(52) U.S. Cl. ........................................ 367/127

(58) Field of Classification Search ............ 367/127, 367/906
See application file for complete search history.

(56) References Cited

U.S. PATENT DOCUMENTS

| | | | |
|---|---|---|---|
| 2,435,231 A | 2/1948 | McPherson | |
| 2,962,696 A | 11/1960 | Snyder | |
| 3,268,856 A * | 8/1966 | Wallen, Jr. ................ | 367/906 |
| 3,445,807 A * | 5/1969 | Boren et al. .............. | 367/906 |
| 4,283,989 A | 8/1981 | Toulios et al. | |
| 4,813,877 A | 3/1989 | Sanctuary et al. | |
| 4,827,411 A | 5/1989 | Arrowood et al. | |
| 4,970,698 A | 11/1990 | Dumestre, III | |
| 5,093,824 A | 3/1992 | Coan et al. | |
| 5,241,518 A | 8/1993 | McNelis et al. | |
| 5,243,592 A | 9/1993 | Perlman et al. | |
| 5,258,962 A | 11/1993 | Karlsen | |
| 5,280,457 A | 1/1994 | Figueroa et al. | |
| 5,346,210 A | 9/1994 | Utke et al. | |
| 5,392,258 A | 2/1995 | Gabrielson et al. | |
| 5,544,129 A | 8/1996 | McNelis | |
| 5,586,086 A | 12/1996 | Permuy et al. | |
| 5,617,371 A | 4/1997 | Williams | |

(Continued)

FOREIGN PATENT DOCUMENTS

EP 0447725 9/1991

(Continued)

OTHER PUBLICATIONS

Mays, Brian T., "Shockwave and Muzzle Blast Classification via Joint Time Frequency and Wavelet Analysis", US Army Research Laboratory, Adelphi, MD, Sep. 30, 2001.

(Continued)

*Primary Examiner* — Daniel Pihulic
(74) *Attorney, Agent, or Firm* — Lando & Anastasi, LLP

(57) ABSTRACT

The systems and methods described herein relate to an airborne shooter detection system having a plurality of sensors coupled to the body of an aircraft such as a helicopter. The sensors are arranged to receive shockwave-only signals. The received signals are analyzed to determine an unambiguous shooter location. The analysis may include measuring the arrival times of the shockwaves of projectiles at each of the sensors, determining the differences in the arrival times among sensors, computing a set of ambiguous solutions corresponding to a shooter, and clustering this set of solutions to determine the unambiguous shooter location. The systems and methods described herein may also be used to determine if multiple shooters are present, and subsequently determine the shooter locations for each of the multiple shooters.

43 Claims, 12 Drawing Sheets

U.S. PATENT DOCUMENTS

| | | | |
|---|---|---|---|
| 5,703,321 | A | 12/1997 | Feierlein et al. |
| 5,742,820 | A | 4/1998 | Perlman et al. |
| 5,777,948 | A | 7/1998 | Ferkinhoff et al. |
| 5,781,505 | A | 7/1998 | Rowland |
| 5,850,592 | A | 12/1998 | Ramanathan |
| 5,878,000 | A | 3/1999 | Dubois |
| 5,878,095 | A | 3/1999 | Kainulainen |
| 5,881,246 | A | 3/1999 | Crawley et al. |
| 5,912,862 | A | 6/1999 | Gustavsen et al. |
| 5,913,921 | A | 6/1999 | Tosey et al. |
| 5,920,522 | A | 7/1999 | Levanon |
| 5,930,202 | A | 7/1999 | Duckworth et al. |
| 5,970,024 | A | 10/1999 | Smith |
| 5,973,998 | A | 10/1999 | Showen et al. |
| 6,041,654 | A | 3/2000 | Stake |
| 6,055,523 | A | 4/2000 | Hillis |
| 6,088,622 | A | 7/2000 | Dollin et al. |
| 6,178,141 | B1 | 1/2001 | Duckworth et al. |
| 6,198,694 | B1 | 3/2001 | Kroling et al. |
| 6,223,458 | B1 | 5/2001 | Schwinkendorf et al. |
| 6,349,091 | B1 | 2/2002 | Li |
| 6,370,084 | B1 | 4/2002 | Cray |
| 6,385,174 | B1 | 5/2002 | Li |
| 6,418,299 | B1 | 7/2002 | Ramanathan |
| 6,470,329 | B1 | 10/2002 | Livschitz |
| 6,487,516 | B1 | 11/2002 | Amorai-Moriya et al. |
| 6,487,587 | B1 | 11/2002 | Dubey |
| 6,563,763 | B2 | 5/2003 | McNelism |
| 6,621,764 | B1 | 9/2003 | Smith |
| 6,745,224 | B1 | 6/2004 | D'Souza et al. |
| 6,847,587 | B2 | 1/2005 | Patterson et al. |
| 6,965,312 | B2 | 11/2005 | Lerg |
| 6,965,541 | B2 | 11/2005 | Lapin et al. |
| 6,977,937 | B1 | 12/2005 | Weinstein et al. |
| 7,054,228 | B1 | 5/2006 | Hickling |
| 7,126,877 | B2 | 10/2006 | Barger et al. |
| 7,139,222 | B1 | 11/2006 | Baxter et al. |
| 7,162,043 | B2 | 1/2007 | Sugiyama et al. |
| 7,190,633 | B2 | 3/2007 | Brinn et al. |
| 7,203,132 | B2 | 4/2007 | Berger |
| 7,266,045 | B2 | 9/2007 | Baxter et al. |
| 7,292,501 | B2 | 11/2007 | Barger |
| 7,362,654 | B2 | 4/2008 | Bitton |
| 7,372,772 | B2 | 5/2008 | Brinn et al. |
| 7,372,773 | B2 | 5/2008 | Horak |
| 7,372,774 | B1 | 5/2008 | Uzes |
| 7,408,840 | B2 | 8/2008 | Barger et al. |
| 7,411,865 | B2 | 8/2008 | Calhoun |
| 7,420,878 | B2 | 9/2008 | Holmes et al. |
| 7,433,266 | B2 | 10/2008 | Ledeczi et al. |
| 7,474,589 | B2 | 1/2009 | Showen et al. |
| 7,495,998 | B1 | 2/2009 | Deligeorges et al. |
| 7,502,279 | B2 | 3/2009 | Wignall et al. |
| 7,532,542 | B2 | 5/2009 | Baxter et al. |
| 8,149,649 | B1 * | 4/2012 | Brinn et al. ............ 367/906 |
| 2002/0003470 | A1 | 1/2002 | Auerbach |
| 2002/0029214 | A1 | 3/2002 | Yianilos et al. |
| 2004/0100868 | A1 | 5/2004 | Patterson, Jr. et al. |
| 2004/0246902 | A1 | 12/2004 | Weinstein et al. |
| 2005/0194201 | A1 | 9/2005 | Tenghamn et al. |
| 2005/0237186 | A1 | 10/2005 | Fisher et al. |
| 2006/0044941 | A1 | 3/2006 | Barger et al. |
| 2006/0256660 | A1 | 11/2006 | Berger |
| 2007/0030763 | A1 | 2/2007 | Barger et al. |
| 2007/0171769 | A1 | 7/2007 | Brinn et al. |
| 2007/0230269 | A1 | 10/2007 | Ledeczi et al. |
| 2007/0237030 | A1 | 10/2007 | Barger et al. |
| 2008/0008044 | A1 | 1/2008 | Patterson et al. |
| 2008/0084473 | A1 | 4/2008 | Romanowich |
| 2008/0159078 | A1 | 7/2008 | Barger et al. |
| 2008/0162089 | A1 | 7/2008 | Barger et al. |
| 2008/0298176 | A1 | 12/2008 | Fisher et al. |
| 2009/0086577 | A1 | 4/2009 | Ledeczi et al. |
| 2009/0174589 | A1 | 7/2009 | Moraites |
| 2009/0285055 | A1 * | 11/2009 | Barger et al. ............ 367/188 |
| 2010/0020643 | A1 * | 1/2010 | Barger et al. ............ 367/129 |

FOREIGN PATENT DOCUMENTS

| | | |
|---|---|---|
| EP | 0610129 A1 | 8/1994 |
| GB | 2 015 127 A | 9/1979 |
| GB | 2181239 | 4/1987 |
| GB | 2181240 | 4/1987 |
| KR | 20020076005 A | 10/2002 |
| WO | WO-0137483 A | 5/2001 |
| WO | WO-02/082097 A2 | 10/2002 |
| WO | WO-2006096208 A2 | 9/2006 |
| WO | WO-2009046367 | 4/2009 |
| WO | WO-2009053702 | 4/2009 |

OTHER PUBLICATIONS

International Search Report and Written Opinion in International Application No. PCT/US2010/048133 dated Dec. 13, 2010.

U.S. Appl. No. 11/904,452, Brinn et al.

"Countersniper System", ISIS, 2008; Vanderbilt University/School of Engineering, retrieved from http://www.isis.vanderbilt.edu/projects/countersniper on Aug. 6, 2009.

Aceves et al., "Analysis of Routing Strategies for Packet Radio Networks," Proc. of the IEEE INFOCOM '85, Washington, DC, 292-302 (185).

Balogh, et al, "Wireless Sensor Network-Based Projectile Trajectory Estimation", Insitute for Software Integrated Systems, Vanderbilt University (2008).

Boggs, Jeffrey A., "Geolocation of an Audio Source in a Multipath Environment Using Time-of-Arrival" Air Force Institute of Technology, Graduate School of Engineering and Management Mar. 2003-Mar. 2004.

Chadha, Ankit, "Development of a new technology for sound source localisation", Thesis submitted to the Faculty of the Graduate School of Wayne State University, Detroit, Michigan (2007).

Chu, et al, "Semantic context detection using audio event fusion: Camera-ready version", EURASIP Journal on Applied Signal Processing, vol. 2006, Article ID 27390, pp. 1-12.

Chu, et al, "Toward semantic indexing and retrieval using hierarchical audio models", Multimedia Systems (2005) 10(6): 570-583; Received: Apr. 16, 2004 / Revised: Nov. 20, 2004 / Published online: May 10, 2005.

Collings, S.W., "Acoustic Beamforming on Wireless Sensor Nodes", Thesis submitted to the Faculty of the Graduate School of Vanderbilt University, May 2008.

Danicki, E., "The shock wave-based acoustic sniper localization," Nonlinear Analysis, Elsevier, 65 (2006), pp. 956-962.

European Search Report in European Application No. EP08004009 dated Mar. 12, 2009.

Final Office Action, U.S. Appl. No. 12/075,051, mailed Feb. 10, 2009.

Hahn et al "Packet Radio Network Routing Algorithms: A Survey," IEEE Communications Magazine, 22:11, 41-7 (Nov. 1984).

Jubin et al., "The DARPA Packet Radio Network Protocols," Proc. of the IEEE, 75:1, 21-32 (Jan. 1987).

Julier, et al, "BARS: Battlefield Augmented Reality System", Advanced Information Technology, Naval Research Laboratory (2007).

Kahn, "The Organization of Computer Resources into a Packet Radio Network," IEEE Trans. on Communications. COM-25:1, 169-78 (Jan. 1977).

Kalyanmoy Deb, Mutt-Objective Optimization Using Evolutionary Algorithms, John Wiley & Sons, Ltd., pp. 85-101 (2001).

Karsai et al, "A Model-based Front-end to TAO/ACE: The Embedded System Modeling Language" Institute for Software-Integrated Systems, Vandebilt University (2008).

Kushwaha, et al, "Sensor Node Localization Using Mobile Acoustic Beacons". Institute for Software Integrated Systems, Vanderbilt University (2005).

Kusy, et al, "Elapsed time on arrival: a simple and versatile primitive for canonical time synchronisation services", Int. J. Ad Hoc and Ubiquitous Computer, vol. x, No. x, 200x (2006).

Lauer, "Packet Radio Routing," Ch. 11, "Routing in Communications Networks," ed. Martha Steenstrup, Prentice Hall, pp. 352-396 (1995).

Ledeczi et al, "Multiple Simultaneous Acoustic Source Localization in Urban Terrain." Institute for Software Inegrated Systems, pp. 491-496, ISBN#0-7803-9201-9 (2005).

Livingston, et al, "An augmented reality system for military operations in urban terrain", Proceedings of the Interservice/Industry Training, Simulation & Education Conference (I/ITSEC '02), Dec. 2-5, 2002.

Marano, et al, "Support-based and ML approaches to DOA estimation in a dumb sensor network", IEE Transactions on Signal Processing, vol. 54, No. 4, Apr. 2006.

Maroti et al, "Shooter Localization in Urban Terrain," Computer, 37:8, Aug. 2004, pp. 60-61.

Martinez, et al, "Sensor network applications", IEE Computer Society, vol. 37, No. 8, Aug. 2004.

Molnar et al, "Muzzle Blast Detection Via Short Time Fourier Transform", Feb. 2005, Vanderbilt University, pp. 1-2.

Moy, John, "Link-State Routing,", Ch. 5, "Routing in Communications Networks," ed. Martha Steenstrup, Prentice Hall, pp. 136-57 (1995).

Pecina, J.N., "Unmanned Navigation with a Novel Laser and a Smart Software," Aerospace Conference, 2003. Proceedings. 2003 IEEE, vol. 1, Mar. 8-15, 2003 pp. 305-312.

Pierce, Allen D., "Nonlinear Effects in Sound Propagation", Acoustics, McGraw-Hill Book Company, pp. 611-614 (1981).

Salisbury, David F, "Network turns soldiers' helmets into sniper location system", Phys.Org.com, retrieved from http://www.physorg.com/news157123967.html on Aug. 7, 2009.

Stephen, Tan Kok Sin, "Source Localization Using Wireless Sensor Networks", Naval Postgraduate School, Jun. 2006.

Stoughton, R.B., "SAIC Sentinel Acoustic Counter-Sniper System," Proceedings of SPIE, vol. 2938, Nov. 19, 1996, pp. 276-284, XP00251780, Section 3.

U.S. Appl. No. 09/546,052, filed Apr. 10, 2000; Joseph Jacob Weinstein et al.; Radio Network Routing Apparatus; 31 pages.

U.S. Appl. No. 10/752,988, filed Jan. 7, 2004; Joseph Jacob Weinstein et al; Systems and Methods for Constructing a Virtual Model of a Multi-Hop, Multi-Access Network.

U.S. Appl. No. 10/797,030, filed Mar. 11, 2004; Joseph Jacob Weinstein et al.; Systems and Methods for synchronizing Multiple Copies of a Database Using Database Digest.

Volgyesi, et all, "Shooter localization and weapon classification with soldier-wearable networked sensors", Institute for Software Integrated Systems, Vanderbilt University (2008).

US 5,168,475, 12/1992, McNelis et al. (withdrawn)

\* cited by examiner

SYSTEMS AND METHODS FOR DISAMBIGUATING SHOOTER LOCATIONS WITH SHOCKWAVE-ONLY LOCATION

CROSS-REFERENCE TO RELATED APPLICATIONS

This application claims priority to U.S. Provisional Patent Application No. 61/247,921, filed Oct. 1, 2009. The contents of this application are hereby incorporated herein in their entirety.

GOVERNMENT CONTRACT

The U.S. Government has a paid-up license in this disclosure and the right in limited circumstances to require the patent owner to license others on reasonable terms as provided for by the terms of Contract No. HR0011-07-C-0103 awarded by the Defense Advanced Research Projects Agency.

FIELD

The present disclosure relates generally to airborne security systems, and more particularly to a system for and a method for airborne shooter detection and localization.

BACKGROUND

With recent developments in weapons technology combined with an evolving face of global terrorism, there has been an increase in the threat posed to aircraft in combat, rescue and humanitarian missions. In particular, terrorist militiamen are using inexpensive, portable and readily available weapons such as sniper rifles, assault rifles and shoulder-fired missiles against low flying aircraft, such as helicopters and airplanes, during flight, landing and takeoff. Many military aircraft have systems on board to identify approaching surface-to-air or air-to-air missiles and can defend themselves by deploying appropriate countermeasures.

However, sniper rifles and assault rifles pose larger problems to civilian aircraft as well as conventional on-board defense systems on military aircraft. These weapons tend to be lightweight and require little or no training to operate. Moreover, the projectiles from these weapons are much smaller than conventional missiles. Consequently, they are difficult to detect using conventional on-board missile defense systems. Additionally, these weapons are difficult to counter because they are portable. There could be any number of armed individuals moving from one place to another firing at overhead aircraft. Therefore, target aircraft would need to not only deploy counter measures, but also identify and neutralize the source of the gunfire.

Few systems exist for determining the location of a shooter from an aircraft. These systems generally include sensors that record acoustic shockwave-only signals generated by the projectile. One such airborne shooter detection system is disclosed in commonly-owned U.S. patent application Ser. No. 12/220,745, the contents of which are incorporated herein in their entirety. However, when multiple projectiles are fired at an aircraft and/or when these projectiles are fired by multiple shooters, these systems may have difficulty determining the location of the shooter(s). Airborne shooter detection systems may incorporate infra red (IR) or ultra violet (UV) sensors to detect incoming projectile tracer fire, but these systems have a significant disadvantage in that they are unable to detect ball ammunition.

Accordingly, there is a need for an airborne shooter detection system that is capable of determining the location(s) of one or more shooters who fire multiple projectiles at an aircraft.

SUMMARY

The systems and methods described herein include improved systems and methods for detecting, from an aircraft, the source of projectiles such as bullets. Traditional ground-based techniques for disambiguating shooter locations using muzzle blast signals are inapplicable in aircraft such as a helicopter. This is because the frequency range of muzzle blast signals overlaps the frequency range of acoustic noise on a helicopter and the acoustic noise on the body of the helicopter tends to drown out signals from muzzle blasts. Thus, airborne shooter detection systems in aircraft such as helicopters rely only on shockwave-only signals, which are associated with a shooter ambiguity problem, i.e., because they rely on shockwave-only signals, these systems cannot always be used to easily determine an unambiguous shooter location. This is particularly true in the case of multiple shooters and/or multiple projectiles.

The shooter ambiguity problem is the following: for a given shooter position and bullet trajectory, there is another shooter position and bullet trajectory for which the shockwave-only signal received at a given set of acoustic sensors is nearly identical. The two ambiguous solutions—a so-called "true" solution and a so-called "bogus" solution or shooter location—are substantially identical if, in a simplified model, the shockwave-only signal is assumed to propagate across the sensors as a plane wave. The true shooter's bullet creates a conical shockwave that strikes the target at a point. The conical generator line at this point has an associated direction, while the curvature in the plane perpendicular to this line has an associated value. The bogus shooter location is the point from which a shot would strike the target at the same contact point, creating an identical conical generator line having an identical curvature. Thus, each of the true and the bogus shooter locations result in identical conical shockwaves that strike the target at the same point. One difference between the two cones is their changing curvature as the shockwave-only plane perpendicular to the line moves away from the target contact point. In particular, the radius of curvature of the cone will decrease as the plane moves away from the direction of the true shooter. Thus, one method for correctly choosing between the true and bogus shooter locations would be to correctly determine in which direction the radius of curvature of the cone decreases or increases. However, correctly identifying the true shooter location in this manner is difficult, particularly in the presence of ambient noise, or when multiple projectiles are fired at an aircraft, and/or when these projectiles are fired by multiple shooters. The systems and methods described herein, overcome these and other deficiencies.

The systems and methods described herein assume that at least two shots are fired at the aircraft, e.g., with machine gun weapons fired at an aircraft, there are many individual shots. The two shots may be fired from the same weapon or from two different weapons. In some embodiments, the locations of both true and bogus shooter are computed for each shot. Generally, the true shooter locations group closer because the shooter does not physically move much during the burst. In contrast, the bogus shooter locations are wider-spaced, because both aircraft motion and weapon slewing cause bogus shooter locations to move around. Generally, one or the other of the two possible shooter locations (true and bogus)

found for each shot are spaced closer to a unique point in space (a first group), while the ones not in this group are spaced wider to a different point in space (a second group). In one embodiment, the correct location is selected to be at the center of the group or "cluster" of close-spaced shooter locations. In one embodiment, a clustering algorithm may be used to find the mean distance between points in each group or cluster of shooter locations, and the center of the group or cluster with smaller distance can be used to find the true shooter's location.

More particularly, in one aspect, the invention relates to an airborne shooter detection system for determining a shooter location based on shockwave-only signals associated with a plurality of projectiles fired at an aircraft. The system includes a plurality of sensors spaced apart on the surface of the body of the aircraft. The sensors are configured for receiving signals indicative of one or more characteristics of a shockwave of a projectile, i.e., shockwave-only signals. Each of the received shockwave-only signals may correspond to potentially ambiguous solutions for the shooter's location. The system also includes at least one processor. The at least one processor is in communication with the plurality of sensors, and is configured to analyze the received shockwave-only signals, compute a set of ambiguous solutions for the shooter location, cluster the set of ambiguous solutions, and determine the unambiguous shooter location based on the clustering. The unambiguous solution may then be output to an output device that is in communication with the at least one processor. The output device may include at least one of a display, heads-up display (HUD), helmet display, intercom, radio and headset.

In certain embodiments, analyzing the signals may include measuring at least an initial portion of the signals. Analyzing the signals further may include determining from the measured initial portion of the signals Time Differences Of Arrival (TDOA). In certain embodiments, analyzing the signals includes determining, from the arrival times of the shockwave-only signal(s) at the sensors, at least one of the arrival angle, the radius of curvature and the spatial gradient of the radius of curvature of the shockwave. The spatial gradient of the radius of curvature may be used to unambiguously determine the location of the source of the projectile.

In certain embodiments, the at least one processor receives data from an aircraft avionics system. The data from the aircraft avionics system may include at least one of temperature, attitude, altitude and ground speed.

In some embodiments, clustering the set of ambiguous solutions includes at least one processor configured for determining a set of close-spaced ambiguous solutions associated with at least one true shooter and a set of wide-spaced ambiguous solutions associated with at least one bogus shooter. In some embodiments, clustering the set of ambiguous solutions includes at least one processor configured for fitting a cluster around the set of close-spaced ambiguous solutions. The close-spaced ambiguous solutions are associated with the unambiguous shooter location. In some embodiments, fitting the cluster includes having at least one processor configured for selecting a center of the cluster for the set of close-spaced ambiguous solutions. In certain embodiments, the cluster is an ellipse. In certain embodiments, fitting the cluster includes determining at least-squares fit for the cluster enclosing the set of close-spaced ambiguous solutions. In certain embodiments, the at least one processor is configured for selecting the center of the cluster as the unambiguous shooter location.

In some embodiments, the system further comprises the at least one processor configured for determining that at least two shooters are associated with the received shockwave-only signals. The at least one processor may compute respective sets of ambiguous solutions for each respective shooter location, and determine at least two unambiguous shooter locations that are associated with each of the at least two shooters.

In some embodiments, computing the set of ambiguous solutions includes having at least one processor configured for computing TDOA from the initial portions of each received shockwave-only signal for each sensor pair of the plurality of sensors, determining an azimuth and an elevation for each respective incoming shockwave plane, determining a closest point of approach (CPA) for each respective projectile trajectory, and determining the set of ambiguous shooter locations. The set of ambiguous solutions is determined based at least in part on the computed TDOA, the azimuth and the elevation for the incoming shockwave plane, and the CPA for the respective projectile trajectory. In some embodiments, this determination includes using a genetic algorithm. The genetic algorithm may use a set of values for at least three of the computed TDOA, the azimuth and the elevation for the incoming shockwave plane, the CPA for the respective projectile trajectory, a projectile Mach number, and an angle between the CPA for the respective projectile trajectory and a normal to the respective shockwave plane.

In another aspect, the invention relates to an airborne shooter detection system for determining at least two shooter locations for at least two shooters. The determination is based on shockwave-only signals associated with a plurality of projectiles fired at an aircraft. The system includes a plurality of sensors spaced apart on the surface of the body of the aircraft. The sensors are configured for receiving the shockwave-only signals, and the shockwave-only signals are indicative of potentially ambiguous solutions corresponding to the at least two shooter locations. The system also includes at least one processor in communication with the plurality of sensors. The at least one processor is configured for determining that at least two shooters are associated with the received shockwave-only signals. The at least one processor is also configured for computing respective sets of ambiguous solutions for each respective shooter location, and determining at least two unambiguous shooter locations associated with the at least two shooters. The at least one processor is also in communication with an output device to which the at least two unambiguous shooter locations are communicated.

In some embodiments, determining at least two shooters are associated with the received shockwave-only signals includes analyzing each received respective shockwave-only signal, and associating each received shockwave-only signal with each respective shooter of the at least two shooters. In some embodiments, associating includes computing a characteristic associated with each respective shooter. The characteristic may be a firing rate associated with a first of the at least two shooters and/or a firing rate associated with a second of the at least two shooters. Alternatively, or additionally, the characteristic may be a projectile caliber associated with a first of the at least two shooters and/or a projectile caliber associated with a second of the at least two shooters.

In some embodiments, the at least one processor comprises a plurality of processors. In these embodiments, a first processor of the plurality of processors may be configured for computing a set of ambiguous solutions for a first shooter location and a second processor of the plurality of processors may be configured for computing a set of ambiguous solutions for a second shooter location.

In some embodiments, the at least one processor is configured for clustering the respective sets of ambiguous solutions, and for determining the unambiguous shooter locations based on the clustering.

In some embodiments, computing the set of ambiguous solutions includes having at least one processor configured for computing TDOA from the initial portions of each received shockwave-only signal for each sensor pair of the plurality of sensors, determining an azimuth and an elevation for each respective incoming shockwave plane, determining a CPA for each respective projectile trajectory, computing at least one of firing rate(s) and projectile caliber(s) corresponding to the at least two shooters, and determining the set of ambiguous shooter locations. The set of ambiguous solutions is determined based at least in part on the computed TDOA, the azimuth and the elevation for the incoming shockwave plane, the CPA for the respective projectile trajectory, and at least one of the computed firing rate(s) and projectile caliber(s). In some embodiments, this determination includes using a genetic algorithm. The genetic algorithm may use a set of values for at least three of the computed TDOA, the azimuth and the elevation for the incoming shockwave plane, the CPA for the respective projectile trajectory, a projectile Mach number, and an angle between the CPA for the respective projectile trajectory and a normal to the respective shockwave plane.

In a third aspect, the invention relates to a method for determining a shooter location based on shockwave-only signals associated with a plurality of projectiles fired at an aircraft. The method comprises receiving the shockwave-only signals, analyzing the received shockwave-only signals, computing a set of ambiguous solutions for the shooter location, clustering the set of ambiguous solutions, determining the unambiguous shooter location based on the clustering, and outputting the unambiguous shooter location to an output device. The shockwave-only signals correspond to potentially ambiguous solutions for the shooter location.

In some embodiments, the method also includes determining that at least two shooters are associated with the received shockwave-only signals, computing respective sets of ambiguous solutions for each respective shooter location, and determining the at least two unambiguous shooter locations associated with each of the at least two shooters.

In a fourth aspect, the invention relates to a method for determining at least two shooter locations for at least two shooters based on shockwave-only signals associated with a plurality of projectiles fired at an aircraft. The method includes receiving the shockwave-only signals, determining that at least two shooters are associated with the received shockwave-only signals, computing respective sets of ambiguous solutions for each respective shooter location, determining at least two unambiguous shooter locations associated with the at least two shooters, and outputting the at least two unambiguous shooter locations on an output device.

In some embodiments, the method also includes determining that at least two shooters are associated with the received shockwave-only signals by analyzing each received respective shockwave-only signal, and associating each received shockwave-only signal with each respective shooter of the at least two shooters.

In some embodiments, the method also includes clustering the respective sets of ambiguous solutions, and determining the unambiguous shooter locations based on the clustering.

BRIEF DESCRIPTION OF THE DRAWINGS

The following figures depict certain illustrative embodiments of the invention in which like reference numerals refer to like elements. These depicted embodiments may not be drawn to scale and are to be understood as illustrative of the invention and as not limiting in any way.

DETAILED DESCRIPTION

To provide an overall understanding of the invention, certain illustrative embodiments will now be described, including display apparatus and constituent components thereof. However, it will be understood by one of ordinary skill in the art that the apparatus described herein may be adapted and modified as is appropriate for the application being addressed and that the systems and methods described herein may be employed in other suitable applications, and that such other additions and modifications will not depart from the scope hereof.

Figure 1:
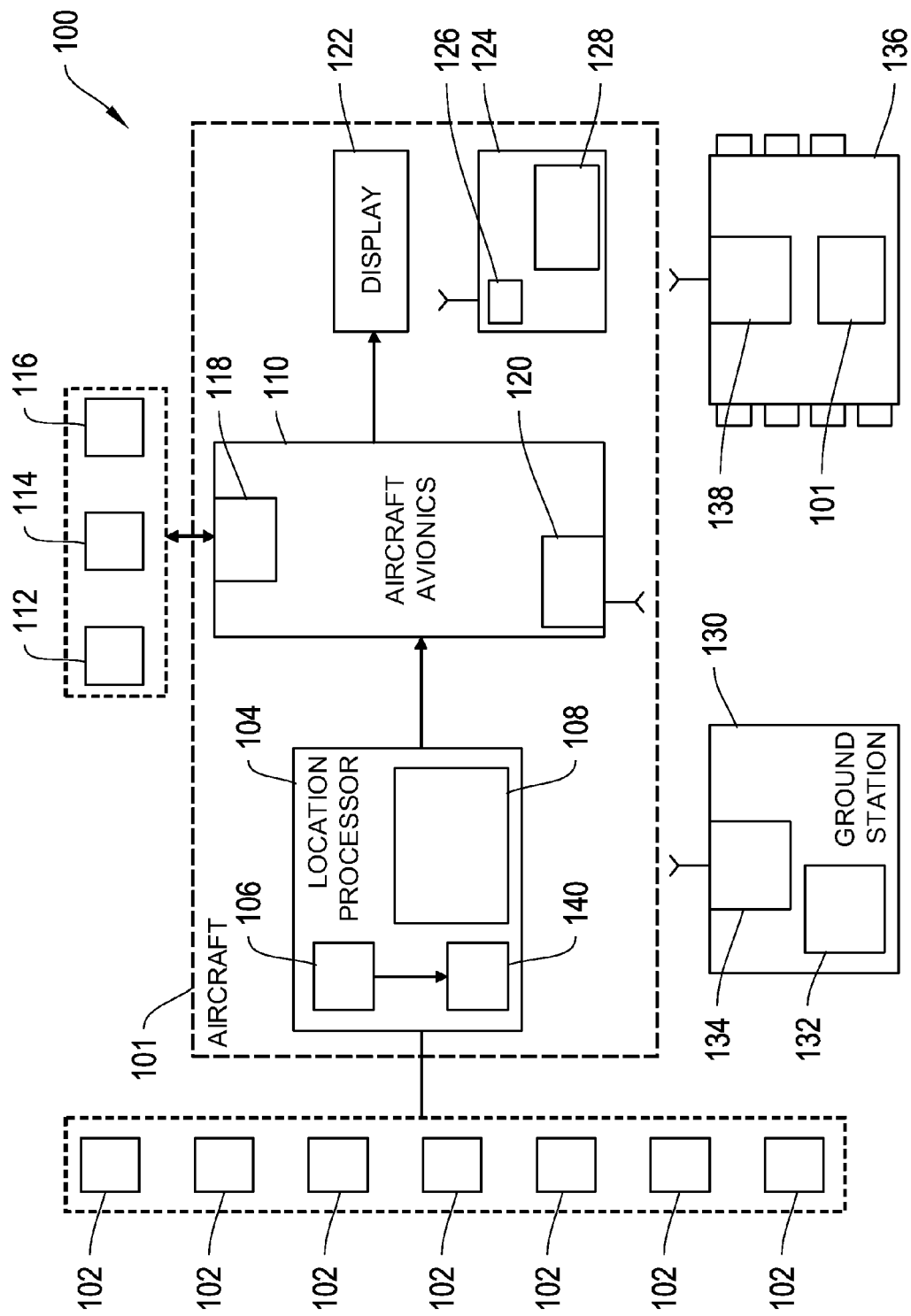
FIG. 1 is a block diagram depicting a detection system on an aircraft for detecting a shooter location, according to an illustrative embodiment of the invention.

FIG. 1 is a block diagram depicting airborne detection system 100 for detecting a shooter location, according to an illustrative embodiment of the invention. The detection system 100 includes a plurality of acoustic sensors 102 disposed on the body of an aircraft 101. The sensors 102 are connected to a location processor 104 and aircraft avionics 110 that may be located inside the body of the aircraft 101. The location processor may include one or more processors configured to perform one or more of the methods described herein. The location processor 104 includes various functional applications and/or hardware subcomponents for managing the sensors 102 and processing data from the sensors 102. Some functional applications include a sensor calibration and control application 106 for operating the sensors 102 and receiving data from them, and a shooter location application 108 for calculating the location of a shooter. The location processor 104 further includes a data transport/conversion/aggregation component 140 for aggregating the sensor data, converting the data to a suitable format and transmitting the data to the shooter location application 108. The aircraft avionics 110 includes a plurality of electronic circuitry and processors for managing, controlling and operating various features of the aircraft. The aircraft avionics 110 includes, among other things, communication circuitry 120 to communicate with a ground station 130 or with other aircraft 136. The avionics 110 also includes an environmental sensor control unit 118 for operating and collecting data from one or more environmental sensors 112, 114 and 116. In certain embodiments, sensors 112, 114, 116 may be interfaced directly with the location processor 104. The environmental sensors, including temperature sensors 112, aircraft attitude, vector velocity sensors 114 and other sensors 116 such as Mean Sea Level (MSL) and/or Above Ground Level (AGL) altimeters, Global Positioning System (GPS) units, Inertial Navigation System (INS) units, and ground velocity sensors are disposed on the external surface of the aircraft fuselage and/or internally.

The avionics 110 is connected to the aircraft's heads-up display 122 for displaying, among other things, relevant shooter location information to the pilot. The avionics 110 may also be remotely connected to the pilot's helmet electronics 124, including a helmet display 128, through the helmet communication circuitry 126. The avionics 110 also communicates with one or more ground stations 130. In certain embodiments, the avionics 110 communicates information about shot detection or shooter location to the pilot via audio/intercom announcements. The avionics 110 may also assist the location processor 104 in determining a shooter location by providing relevant data collected from sensors 112, 114 and 116 and other information obtained from the ground station 130, the ground station detection system 132, another aircraft 136 or from the pilot.

When a projectile such as a bullet, traveling at supersonic speed, approaches the detection system 100, the projectile generates an acoustic shockwave. The shockwave surface is typically an expanding conical surface having its axis coincident with the bullet trajectory. The shockwave surface is also referred to as the Mach cone. To resolve the location of the shooter, the arrival angle, the radius of curvature, and the spatial gradient of the radius of curvature of the expanding conical surface are determined from arrival times measured at the plurality of sensors 102.

In one embodiment, during operation, the sensors 102, whose airframe coordinates (positions on the fuselage) are accurately known, receive one or more acoustic signals representative of the shockwave generated by a bullet or other projectile. The plurality of sensors receive the shockwave-only signal at different times and generate electrical signals in response to the shockwave pressure. The shooter location application 108 in the processor 104 determines a Time-Difference-Of-Arrival (TDOA) from the initial portion of the shockwave-only signals. In one embodiment, the shooter location application 108 determines the TDOA by designating a sensor that first encounters the shockwave as a reference sensor, and determining the time of arrival of the shockwave at the other sensors in relation to the reference sensor. The shooter location application 108 may determine the direction (azimuth and elevation angle) of the origin of the bullet from, among other things, the TDOA information and airframe coordinates of the sensors 102. A more detailed description of this TDOA process for determining shooter location is provided in commonly assigned U.S. Pat. No. 7,126,877, incorporated herein by reference in its entirety. The shooter location application 108 may be created and implemented in the processor 104 using hardware circuitry or using software languages including, but not limited to, C, C++, and JAVA.

In certain situations, solving for the arrival angle relative to the airframe, of the conical surface that first reaches the sensors 102 may result in two possible solutions (often called ambiguous angles or ambiguous solutions). The ambiguous angles or solutions will be described in more detail below with reference to FIG. 4. The radius of curvature of the conical surface at the sensors 102 may determine both distance and direction to the trajectory. The ambiguity between the two possible solutions can be removed by determining and evaluating the gradient of the radius of curvature of the cone.

Determining these shockwave properties (the arrival angle, the radius of curvature, and the spatial gradient of the radius of curvature of the expanding conical surface) accurately, and deciding between the two possible ambiguous trajectories, requires very precise measurements. As described in U.S. patent application Ser. No. 12/220,745, the detection system 100 preferably includes a sufficient number of sensors strategically placed on the surface of the airframe such that most, if not all, shockwaves resulting in potentially ambiguous location solutions are detected by preferably seven, and at least five, sensors 102.

Figure 2:
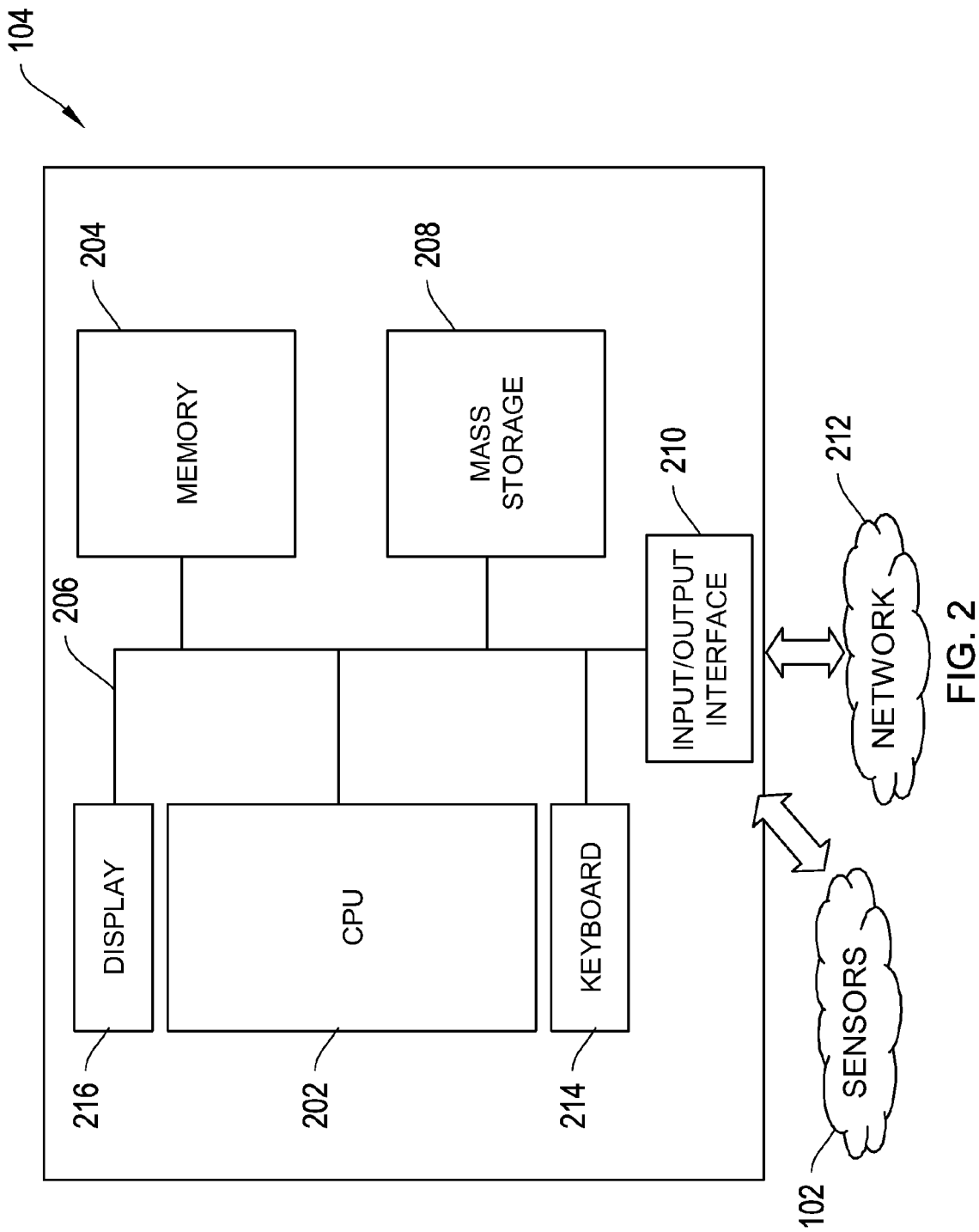
FIG. 2 is a block diagram depicting the physical components of a computer system, according to an illustrative embodiment of the invention.

FIG. 2 is a general block diagram depicting the physical components of a location processor 104, according to an illustrative embodiment of the invention. The exemplary location processor 104 includes a central processing unit (CPU) 202, a memory 204, and an interconnect bus 206. The CPU 202 may include a single microprocessor or a plurality of microprocessors for configuring location processor 104 as a multi-processor system. In some embodiments, at least one processor is configured to determine shooter location. In some embodiments, a plurality of processors are configured to determine shooter location. For instance, if there are two shooters, one processor can be used to process shockwave-only signals received from one of the shooters, and another processor can be used to process shockwave-only signals received from the other shooter. Those skilled in the art will appreciate that many single or multi-processor configurations for location processor 104 are possible.

The memory 204 illustratively includes a main memory and a read only memory. The computer 110 also includes the mass storage device 208 having, for example, various disk drives, tape drives, FLASH drives, etc. The main memory 204 also includes dynamic random access memory (DRAM) and high-speed cache memory. In operation, the main memory 204 stores at least portions of instructions and data for execution by the CPU 202.

The mass storage 208 may include one or more magnetic disk or tape drives or optical disk drives, for storing data and instructions for use by the CPU 202. At least one component of the mass storage system 208, preferably in the form of a disk drive or tape drive, stores the database used for processing the signals measured by the sensors 102. The mass storage system 208 may also include one or more drives for various portable media, such as a floppy disk, a compact disc read only memory (CD-ROM), DVD, or an integrated circuit non-volatile memory adapter (i.e., PC-MCIA adapter) to input and output data and code to and from the location processor 104.

The location processor 104 may also include one or more input/output interfaces for communications, shown by way of example, as interface 210 for data communications via the network 212. The data interface 210 may be a modem, a network card, serial port, bus adapter, or any other suitable data communications mechanism for communicating with one or more systems on-board the aircraft or on the ground. To provide the functions of a computer 104 according to FIG. 1, the data interface 210 may provide a relatively high-speed link to a network 212, such as on-board avionics intranet, or ground based networks such as the Internet. The communication link to the network 212 may be, for example, optical, wired, or wireless (e.g., via satellite or cellular network). Alternatively, the location processor 104 may include a mainframe or other type of host computer system capable of communications via the network 212.

The location processor 104 also includes suitable input/output ports or use the interconnect bus 206 for interconnection with avionics 110, a local display 216 and keyboard 214 or the like serving as a local user interface for programming and/or data retrieval purposes. Alternatively, personnel may interact with the processor 104 for controlling and/or programming the system from remote terminal devices via the network 212.

The location processor 104 may run a variety of application programs and stores associated data in a database on mass storage system 208. One or more such applications may enable the receipt and delivery of messages to enable operation as a server, for implementing server functions relating to measuring acoustic signals and locating the position of a shooter by system 100 of FIG. 1.

In certain embodiments, the CPU 202 includes circuitry for an analog-to-digital converter and/or a digital-to-analog converter. In such embodiments, the analog-to-digital converter circuitry converts analog signals received at the sensors to digital signals for further processing by the location processor 104.

The components contained in the location processor 104 are those typically found in aircraft computer systems, flight-deck avionics, combat avionics, general purpose computer systems used as servers, workstations, personal computers, network terminals, and the like. In fact, these components are intended to represent a broad category of such computer components that are well known in the art. Certain aspects of the invention may relate to the software elements, such as the executable code and database for the server functions of the detection system 100.

Figure 3:
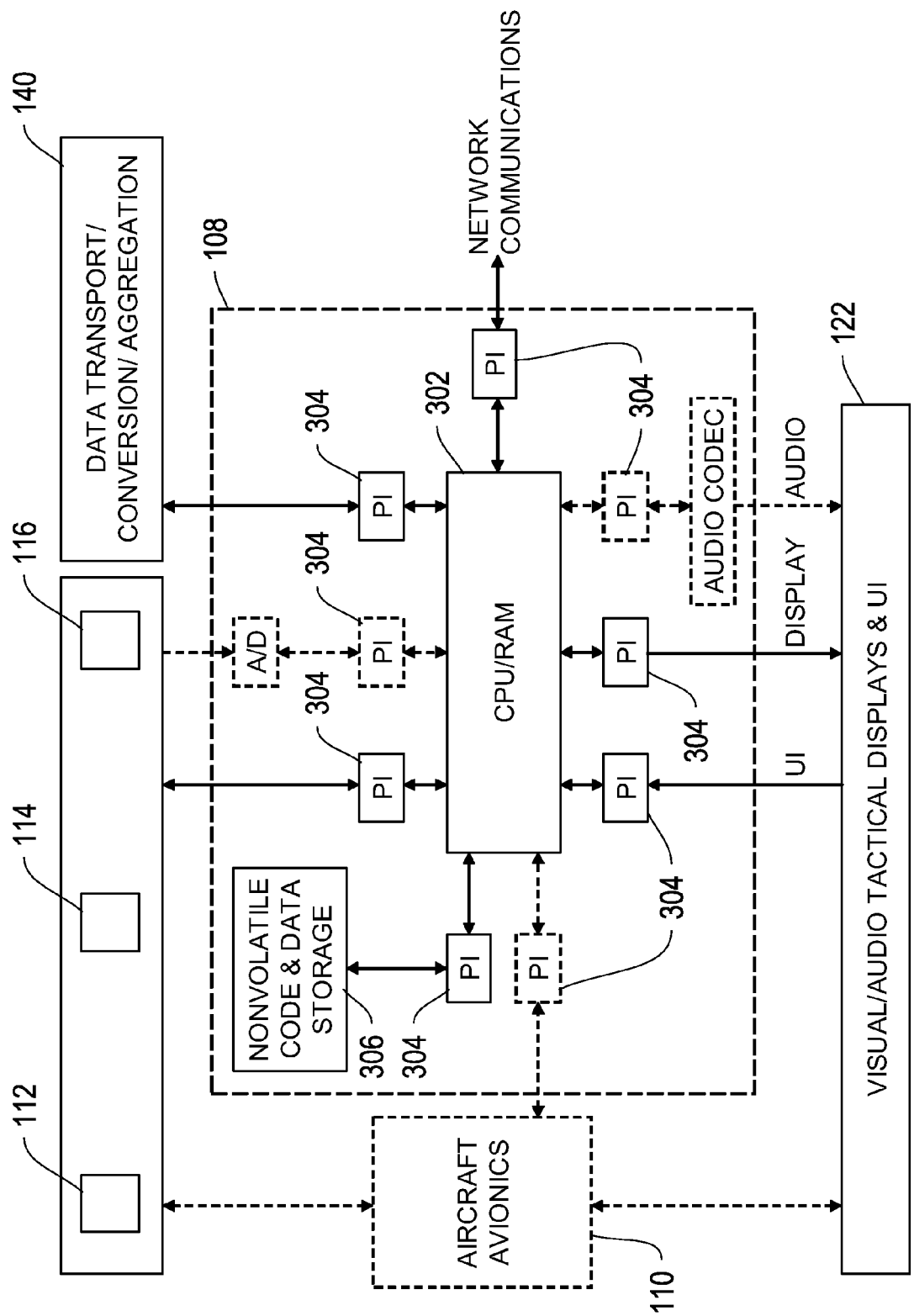
FIG. 3 is a more detailed block diagram depicting the physical components of the computer system of FIG. 2, according to an illustrative embodiment of the invention.

FIG. 3 is a more detailed block diagram depicting the physical components of the computer system of FIG. 2, according to an illustrative embodiment of the invention. In particular, the location processor 104 includes a CPU/RAM unit 302 and a plurality of integrated and/or attached peripheral interfaces ("PI") 704. The PI 304 may serve as a communication link between at least two of data transport unit 140, sensors 112, 114 and 116, data storage 306, displays 122 including helmet display, audio units and network communications. The PI 304 may comprise a suitable interface including at least one of a RS232, RS432, RS422 and RS485 serial ports. The PI 304 may also include at least one of universal serial bus (USB), parallel port, I-squared C bus, I-squared S bus, ARINC 429 bus, MIL-STD-1553 bus, Ethernet, LVDS. The PI 304 may also be fully custom designed for a particular application.

The location processor 104 may also communicate directly with sensor 102. The sensor locations may be influenced by certain mathematical constraints as described below, and may also be constrained by the physical structure of the aircraft 101. Theoretically, it would be preferable to place sensors 102 substantially equally apart on the body of the aircraft, thereby providing a uniformly distributed system 100. However, such an arrangement may be difficult to achieve because of the physical constraints imposed on aircrafts. Conversely, the mathematical constraints imposed on the system 100, such as a preferred sensor spacing may be advantageously accommodated on an aircraft because of its physical size.

Figure 4A:
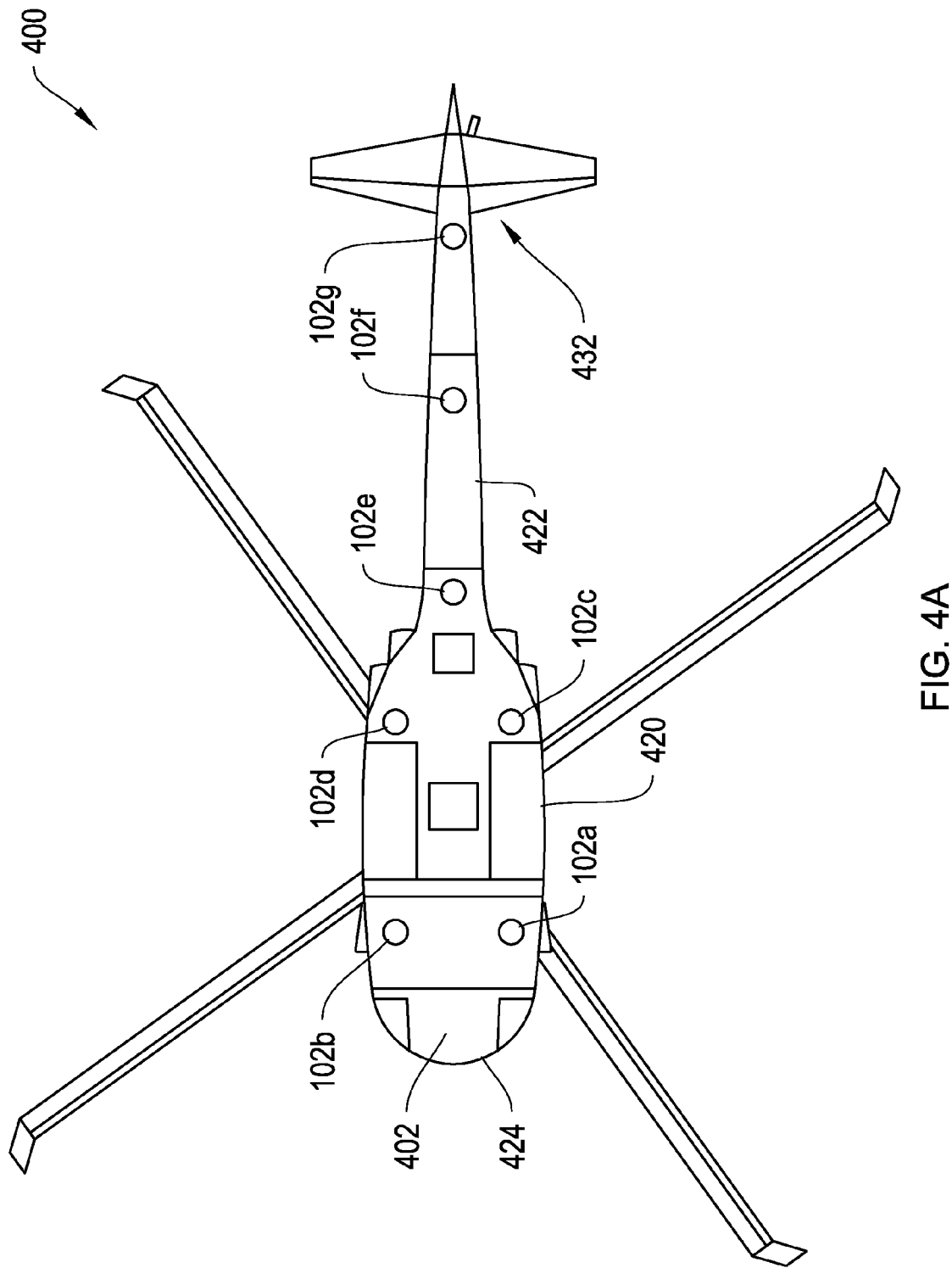
FIGS. 4A and 4B depict bottom and side views, respectively, of a helicopter having a plurality of sensors disposed on the fuselage, according to an illustrative embodiment of the invention.
Figure 4B:
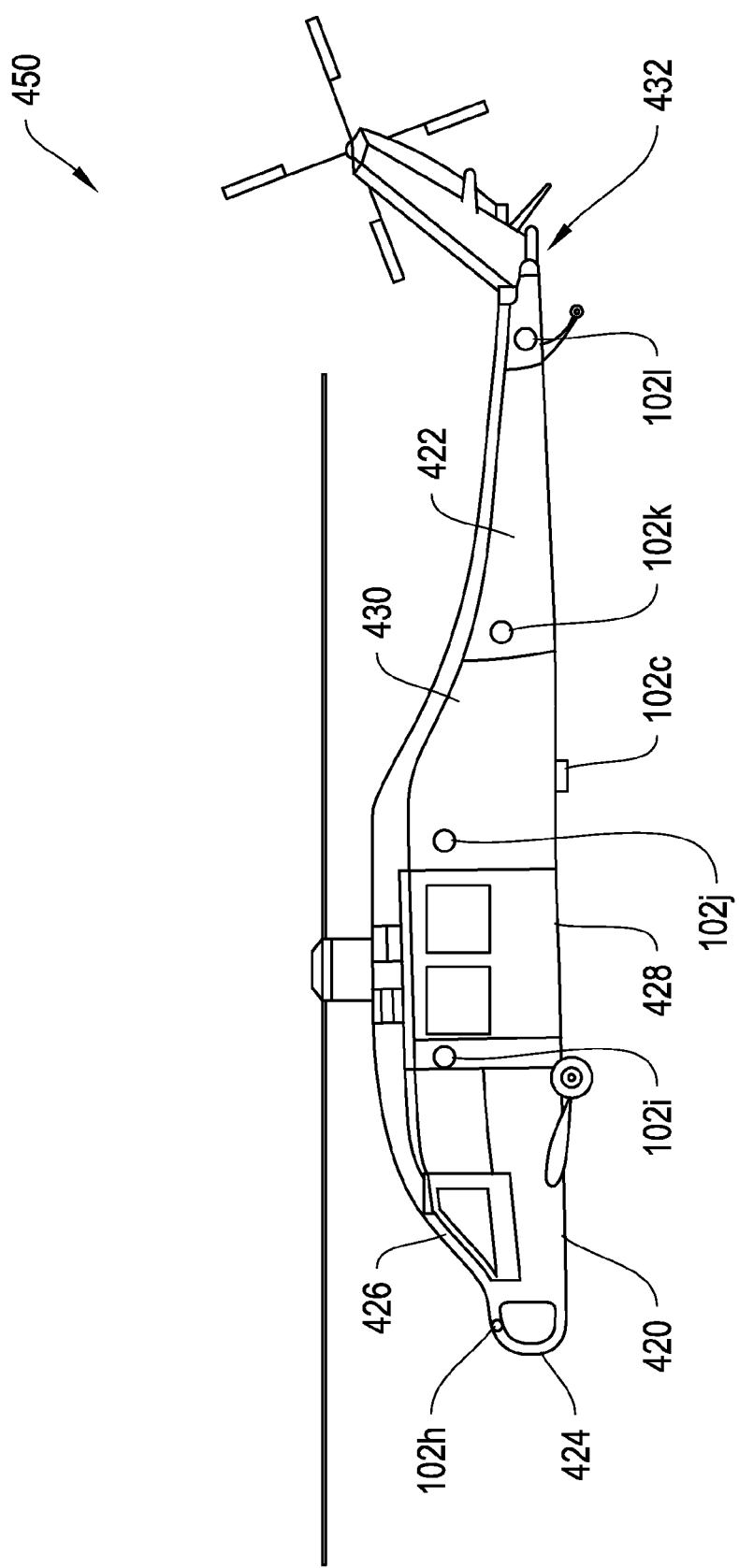

FIGS. 4A and 4B depict bottom 400 and side views 450, respectively, of a helicopter 420 having a plurality of sensors 102 disposed on its fuselage, according to an illustrative embodiment of the invention. As described in U.S. patent application Ser. No. 12/220,745, for purposes of clarity, and not by way of limitation, one exemplary placement of sensors 102 in system 100 may be described herein in the context of placing the sensors 102 on a helicopter. However, it will be appreciated that the principles described herein may be adapted to other aircraft. For example, the principles of this disclosure may be applied to airplanes where the sensors are positioned based on the constraints imposed by the physical structure of the airplane. More generally, the systems described herein may be employed as suitable, and accounting for the constraints present in any aircraft where it is desirable to provide detection system 100.

The bottom portion 400 of the fuselage of the helicopter 420 includes seven sensors 102a-102g positioned from the nose region 424 to the tail region 432. As shown, the region underneath the cockpit 426 includes two sensors 102a and 102b. The regions underneath the cabin 428 and the engine/transmission/fuel tank 530 includes two sensors 102c and 102d. The bottom of tail boom portion 422 includes three sensors 102e, 102f and 102g. In such an arrangement, at least two sensors may be at least 10 m apart. For example, the sensor 102a or 102b under the nose region 424 may be separated from sensor 102g under the tail boom 422 by a distance of greater than about 10 m. One or more physical constraints found on the bottom 400 of the helicopter 420 may influence the placement of the sensors 102a-102g. In certain embodiments, the bottom 400 includes landing gear such as skids or wheel-bays. The sensors 102a-102g may be suitably placed around these physical constraints. In certain embodiments, the sensors 102a-102g may be placed on the skids. In certain embodiments, the sensors 102a-102g may be placed at any location on the bottom 400 as desired. Additional sensors may be placed at various locations along the bottom 400.

The top and side portions 450 of the fuselage of the helicopter 420 include a plurality of sensors 102h-102g positioned from the nose region 424 to the tail region 432. Sensor 102h is placed on the nose 424 of the helicopter 420. Sensor 102i is placed between the cockpit 426 and cabin 428 of the helicopter 420. Sensor 102j is placed on the engine/transmission/fuel tank 430 and sensors 102k and 102l are disposed on the tail boom 422. In certain embodiments, sensor 102h may be placed anywhere on the nose 424 including the front portion. In such an arrangement, at least two sensors may be at least 10 m apart. For example, the sensor 102h on the nose region 424 may be separated from sensor 102l on the tail boom 422 by a distance of greater than about 10 m. One or more physical constraints found on the front and sides 450 of the helicopter 420 may influence the placement of the sensors 102h-102l. As an example, the sides of the helicopter 420 may include a plurality of doors, windows and service bays. The sensors 102h-102l may be suitably placed around these physical constraints.

Sensors similar to sensors 102h-102l may be placed on the side opposite to side 550 of the helicopter 520. In one embodiment, the helicopter 520 includes a total of seventeen sensors including four on each of the right and left side, two in the front on the nose 524 and seven on the bottom 500.

In certain embodiments, the sensors 102 (of FIGS. 1, 2, 3, 4A, 4B) include acoustic sensors, such as microphones. In certain embodiments, the sensors 102 include digital microphones that have delta modulated signal outputs, or analog outputs. In such embodiments, the sensors 102 may be flush-mounted microphones having a diameter of about 1 cm. In such embodiments the sensors 102 may include fairingmounted microphones where the fairings may include windscreens and cavities to offset the microphones from air flow.

Figure 5:
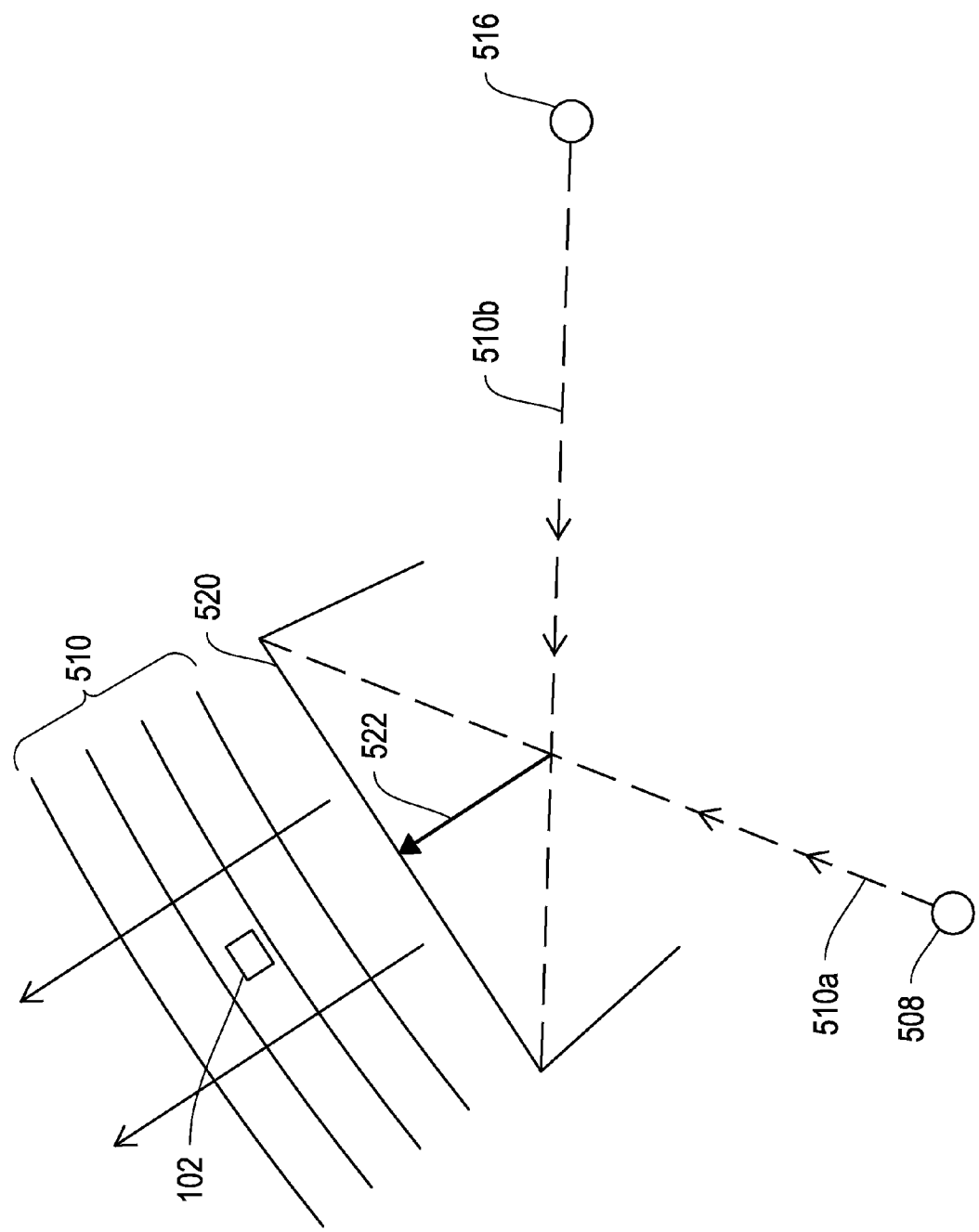
FIG. 5 depicts schematically the ambiguity inherent in detection systems utilizing shockwave-only signals from an incoming projectile.

FIG. 5 depicts schematically the ambiguity inherent in detection systems utilizing only shockwave information from an incoming projectile that approaches one or more of the sensors 102 of FIGS. 1, 2, 3, 4A, 4B. For a given shooter position 508 and bullet trajectory 510a, there is another shooter position 516 and bullet trajectory 510b for which the time of arrival (TOA) at a sensor, or TDOA of the shockwave at a given set of sensors is nearly identical. The two ambiguous solutions—the true and the bogus shooter locations—are substantially identical if in a simplified model, the shockwave 510 is assumed to propagate across the sensor 102 as a plane wave 520 or the "common shockwave element", as shown in FIG. 5. In particular, the shock arrival vector 522 of the shockwave plane wave 520 is identical for each of the two solutions, making them ambiguous solutions. If the TDOA resolution is high enough to resolve the curvature of the shockwave, then the two nearly identical solutions can generally be disambiguated. Assuming sufficiently accurate TDOA measurements, and taking into account that multiple shots may have been fired by a single shooter or that multiple shots may have been fired by at least two shooters, the location processor 104 may obtain the gradient of the curvature and thereby obtain the true solution for shooter location and bullet trajectory by computing the shooter/trajectory combination that minimizes the root-mean-square (RMS) residual of measured and computed shockwave TDOAs. Such a solution method is described in U.S. Pat. No. 7,126,877, the contents of which are hereby incorporated herein in their entirety. These methods may involve the use of a suitable ballistic model as described therein.

The spacing and position of the sensors on an aircraft is important with respect to the shooter ambiguity problem. As mentioned above, an aircraft may have a plurality of sensors strategically positioned around its fuselage. Ambiguity in determining shooter location may exist all around the aircraft because as noted earlier, for every true shooter location, there exists another shooter location (bogus) that may be able to account for the shockwave received at the sensors. Depending on the trajectory of the projectile with respect to the aircraft as well as the aircraft's orientation with respect to ground level, the bogus shooter location may be non-terrestrial, i.e., located in the air above the ground. For the purposes of detecting ground-based shooters, the solutions corresponding to non-terrestrial shooter locations may be easily disregarded. However, as described below in reference to FIGS. 6A and 7A below, when one or more shooters are positioned underneath the aircraft and missing projectiles pass below the aircraft fuselage (missing low), the bogus shooter(s) are generally terrestrial. That is, there are two possible terrestrial shooter locations—a true and a bogus solution. In general, the disambiguation of a single shot cannot be accomplished if the closet point of approach (CPA) of the shockwave is greater than a distance that is controlled by the spacing between sensors and by the time of arrival fluctuations caused by downwash turbulence from the aircraft, e.g., a helicopter. This distance may be less than 60 m, e.g., 30 m for helicopters in flight.

Figure 6A:
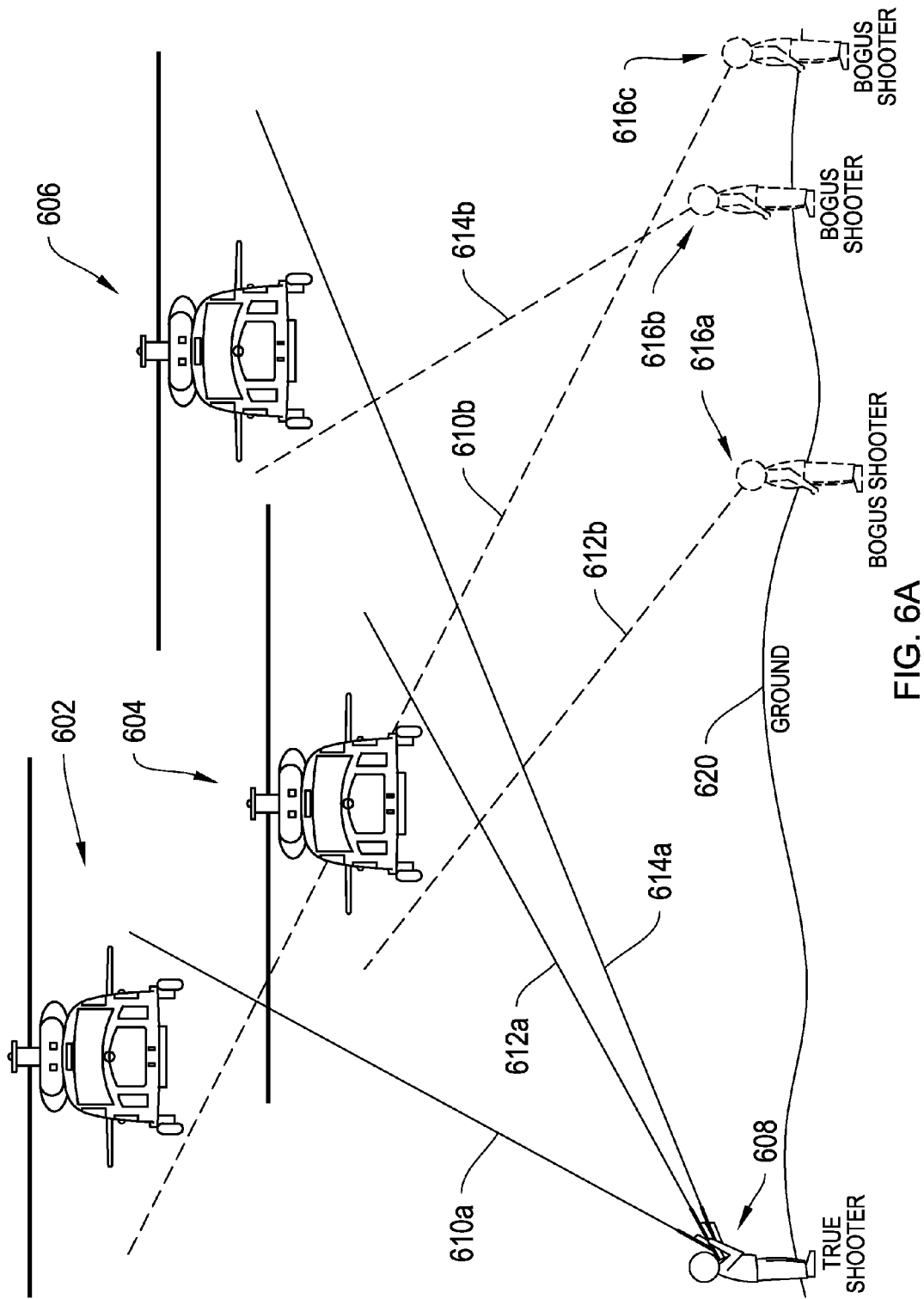
FIG. 6A is an illustration of a shooter firing multiple projectiles at a moving helicopter, according to an illustrative embodiment of the invention.
Figure 6B:
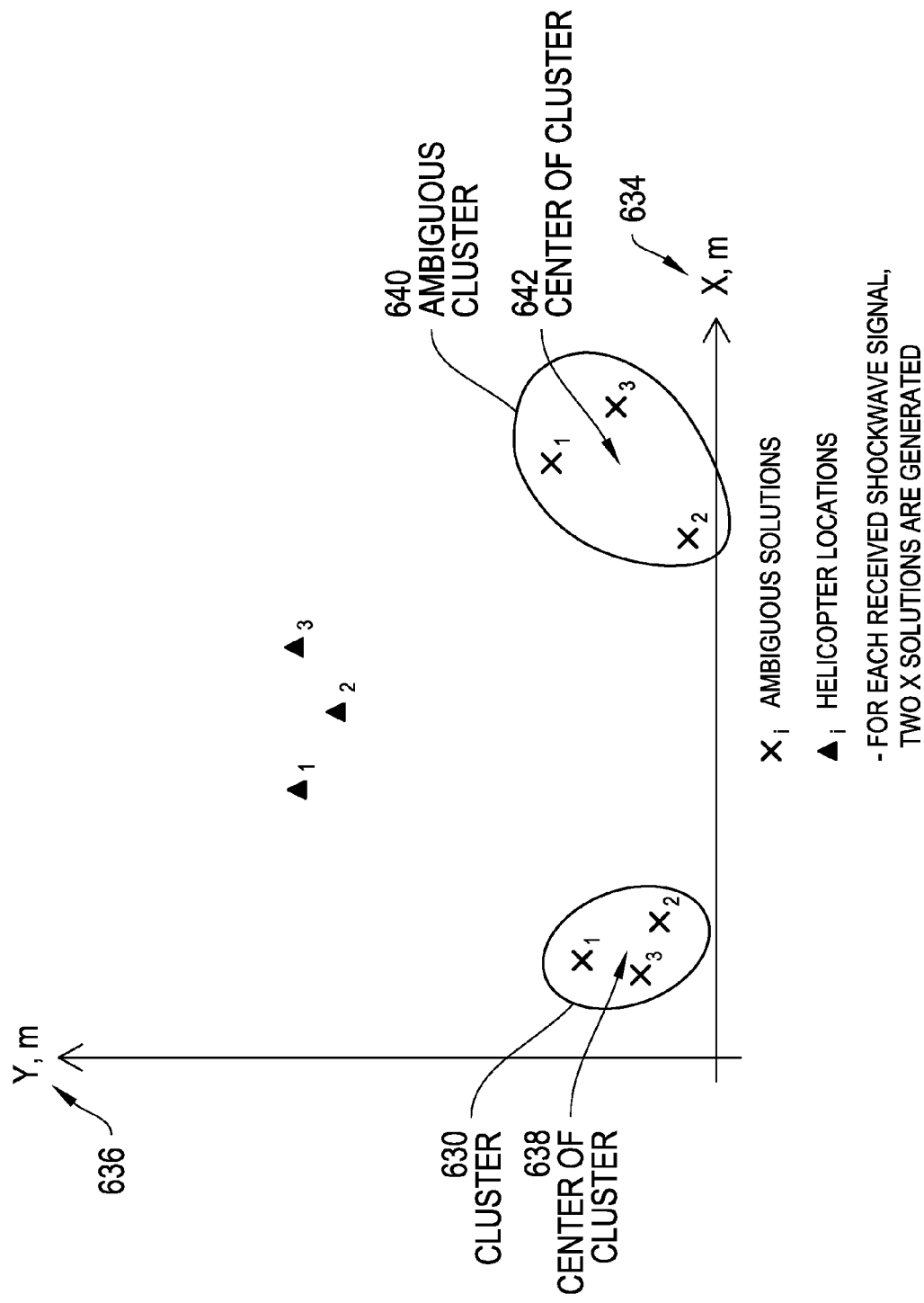
FIG. 6B is an illustration of the clusters of ambiguous shooter locations corresponding to the shooter of FIG. 6A, according to an illustrative embodiment of the invention.
Figure 7A:
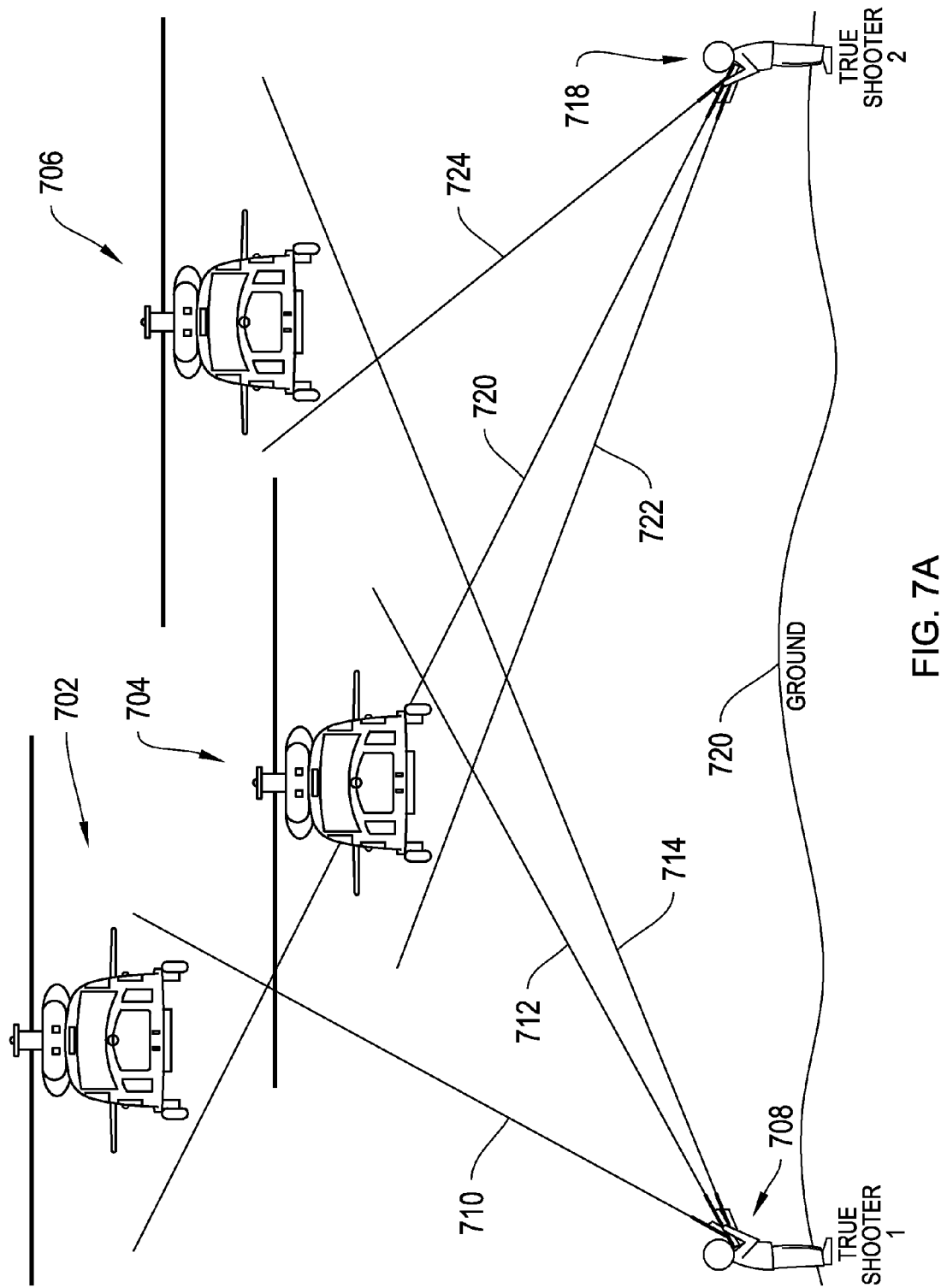
FIG. 7A is an illustration of two shooters firing multiple projectiles at a moving helicopter, according to an illustrative embodiment of the invention.
Figure 7B:
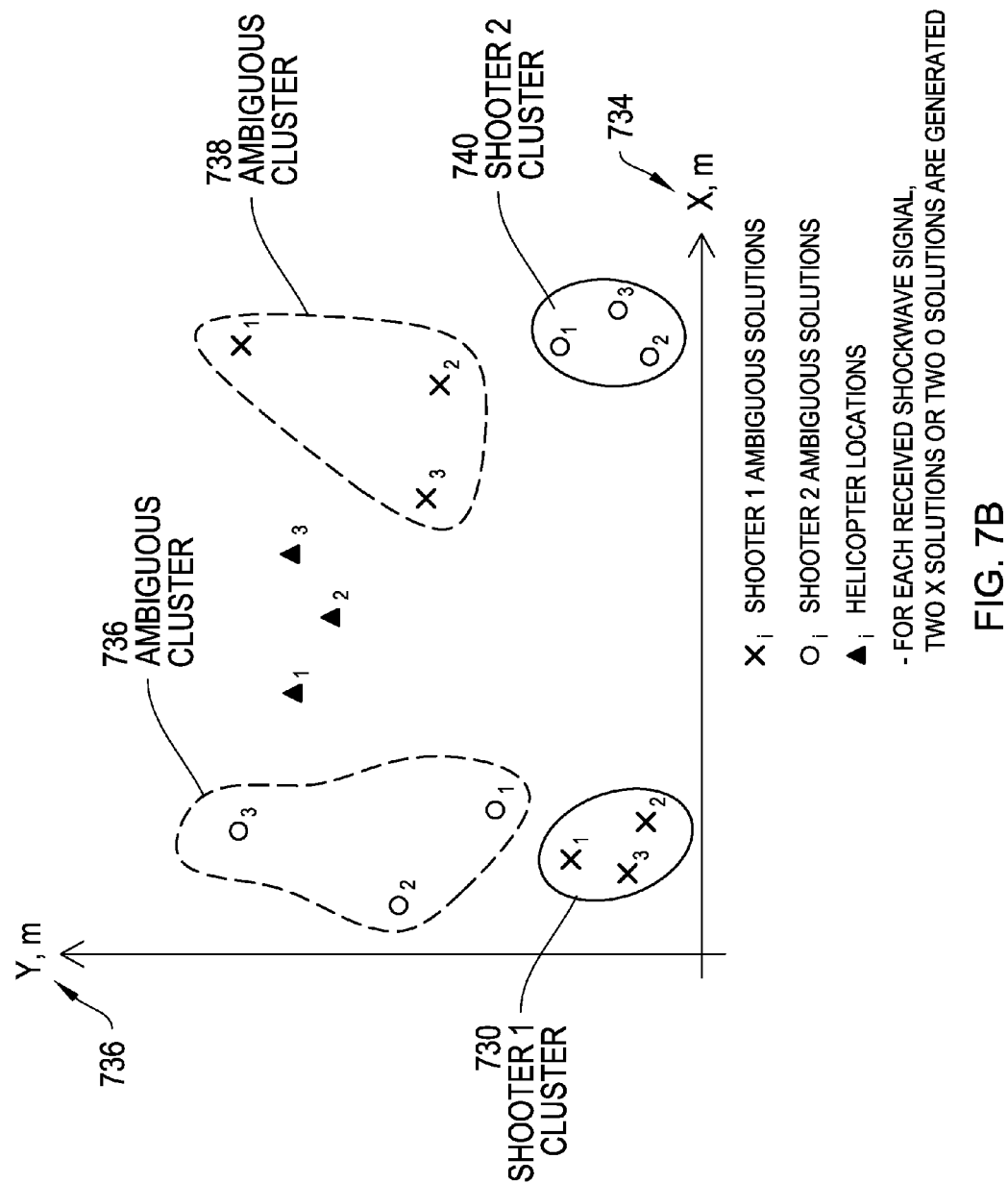
FIG. 7B is an illustration of the clusters of ambiguous shooter locations corresponding to the two shooters of FIG. 7A, according to an illustrative embodiment of the invention.

FIGS. 6A and 6B relate to illustrative embodiments in which a single shooter fires two or more projectiles at an aircraft. FIGS. 7A and 7B relate to illustrative embodiments in which two or more shooters fire two or more projectiles at an aircraft. The determination of unambiguous shooter location(s) by location processor 104 of FIG. 1 for these embodiments will be described below. In the descriptions of FIGS. 6A, 6B, 7A, and 7B, location processor 104 may not always be referred to as performing certain tasks. Nonetheless, it is to be understood that location processor 104 of FIG. 1 is configured to perform the associations, determinations, and computations described below. The actual computations of the ambiguous solutions for shooter location by location processor 104 of FIG. 1 will be described in reference to FIGS. 9A, and 9B below. We turn first to FIG. 6A, and illustrate how the systems and methods described herein could be used to determine an unambiguous shooter location when a single shooter fires two or more projectiles at an aircraft.

FIG. 6A is an illustration of a true shooter 608 firing multiple projectiles (e.g., bullets from a rifle) at a moving helicopter from the ground 620. The moving helicopter is illustrated in three positions on the page marked as positions 602, 604, and 606. The true shooter 608 fires the projectiles along trajectories 610a, 612a, and 614a. Each of these "true" trajectories are associated with shots fired by the true shooter 608 and are directed towards the helicopter at positions 602, 604, and 606, respectively. For illustrative purposes, these true trajectories are shown missing low. Thus, each of the true trajectories has a corresponding "bogus" trajectory, i.e., a trajectory, obtained from solving the equations of a suitable ballistic model, that corresponds to a non-existent or bogus shooter on the ground 620. For instance, trajectory 610a has a corresponding bogus trajectory 610b, trajectory 612a has a corresponding bogus trajectory 612b, and trajectory 614a has a corresponding bogus trajectory 614b. The bogus trajectories 612b, 614b, and 616b correspond to bogus shooter locations 616a, 616b, and 616c.

With continued reference to FIG. 6A, note that each of the bogus shooter locations 616a, 616b, and 616c, could theoretically correspond to projectiles that are associated with shockwave planes that are substantially similar to the shockwave planes associated with projectiles from the true shooter 608. The systems and methods described herein may be used to disambiguate the true shooter location from the bogus shooter location(s). More particularly, when solving a ballistic model using information from one or more shockwave-only signals, a set of ambiguous solutions is obtained and will be described below in more detail in reference to FIGS. 9A and 9B. This set of ambiguous solutions includes solutions corresponding to the true shooter's location, and solutions corresponding to the bogus shooter's locations as shown in the illustration of FIG. 6B.

FIG. 6B is a plot, with X (634) and Y (636) coordinates, of the clusters 630 and 640 of ambiguous shooter locations $x_i$ corresponding to the true (608) and bogus shooters (616a, 616b, 616c) of FIG. 6A. The location of the moving helicopter is depicted with triangles with the subscripts, i.e., $\Delta_1$, $\Delta_2$, and $\Delta_3$. Each received shockwave signal at a particular helicopter location will result in two ambiguous shooter locations. For instance, the shockwave plane propagating towards the helicopter $\Delta_1$, results in the two ambiguous solutions $x_1$. Generally, the solutions for the true shooter's location group closer together because the true shooter does not physically move much during the burst. In contrast, the solutions for the bogus shooter location are spaced wider because both aircraft motion and weapon (e.g., rifle) slewing cause the bogus shooter location to appear to move around. This is the case in the illustration of FIG. 6B in which the group or cluster 630 contains ambiguous solutions $x_1$, $x_2$, and $x_3$ that are close-spaced (generally associated with the true shooter), while group or cluster 640 contains ambiguous solutions $x_1$, $x_2$, and $x_3$ that are wide-spaced (generally associated with the bogus shooter).

The clusters of ambiguous solutions may be disambiguated by determining which cluster corresponds to the unambiguous or true shooter location. Any suitable clustering algorithm may be used to make this determination and/or to find the sets of clusters. For instance, a clustering algorithm may be used to identify all permissible clusters of ambiguous solutions, as well as the cluster with the closest-spaced solutions associated with the true shooter. In some embodiments, the expected angle between the true and bogus shooter solution clusters may be used to determine which sets of ambiguous solutions are permissible. Depending on the Mach number for the bullet fired at the aircraft, the expected angle may be between 80 and 130 degrees, i.e., the angle between a cluster corresponding to the true shooter and a cluster corresponding to the bogus shooter is between approximately 80 and 130 degrees. In some embodiments, the expected shooter range (based, e.g., on the bullet Mach number) may also be used to determine which sets of ambiguous solutions are permissible. For instance, if the expected shooter range is 100 m, any cluster of ambiguous solutions that corresponds to a shooter range greater than 150 m or less than 50 m would not be a permissible cluster. In some embodiments, using a combination of the expected angle between the true and bogus solution clusters and/or the expected shooter range, two permissible clusters of ambiguous solutions may be determined—one corresponding to the true shooter location and the other corresponding to the bogus shooter location.

In one embodiment, the unambiguous or true shooter location is selected to be the shooter location associated with the set of closest-spaced ambiguous solutions for shooter location. In some embodiments, a clustering algorithm may be used to find the mean distance between solutions in each cluster of shooter locations, and the center of the cluster with the smallest mean distance is determined to be the true shooter's location. Those skilled in the art will realize that many such computations of characteristics of a cluster may be performed, and many such rules may be used to determine which cluster corresponds to the true shooter's location. FIG. 6B illustrates two such clusters 630 and 640, with centers 638 and 642, respectively. For illustrative purposes only two clusters are shown in FIG. 6B, however, as described above, any suitable clustering algorithm may be used to determine all permissible clusters of ambiguous solutions. In some embodiments, the cluster is an ellipse, and a clustering algorithm can be used to find the true shooter's location by fitting an ellipse around the sets of ambiguous solutions. In some embodiments, the ellipse that is smallest, e.g., in terms of area or volume, is selected to be associated with the true shooter location, and the center of the ellipse is selected to be the true shooter location.

We turn next to FIG. 7A, and illustrate how the systems and methods described herein could be used to determine unambiguous shooter locations when at least two shooters fire one or more projectiles at an aircraft.

FIG. 7A is an illustration of two shooters 708 and 718 firing multiple projectiles (e.g., bullets from rifles) at a moving helicopter from the ground 720. The moving helicopter is illustrated in three positions on the page marked as positions 702, 704, and 706. True Shooter 1 708 fires projectiles along trajectories 710, 712, and 714. True Shooter 2 718 fires projectiles along trajectories 722, 720, and 724. The fired shots are directed towards the helicopter at positions 702, 704, and 706, respectively. For illustrative purposes, these true shooter trajectories are shown missing low. As was the case in the embodiment of FIG. 6A, each of these true trajectories 710, 712, 714, 722, 720, and 724 has a corresponding bogus trajectory. To simplify the illustration in FIG. 7A, the bogus trajectories for True Shooter 1 708 and True Shooter 2 718 are not shown. However, as will be described below in more detail in reference to FIGS. 9A and 9B, when solving a ballistic model using information from one or more shockwave-only signals received from projectiles fired from true shooter 1 708 or true shooter 2 718, sets of ambiguous solutions are obtained. Each of these sets of ambiguous solutions includes solutions corresponding to the true shooters' locations, and solutions corresponding to the bogus shooter locations as shown in the illustration of FIG. 7B.

FIG. 7B is a plot, with X (734) and Y (736) coordinates, of the clusters 730, 736, 738, and 740 of ambiguous shooter locations corresponding to the true and bogus shooter locations of the embodiment of FIG. 7A. With continued reference to FIGS. 7A and 7B, the ambiguous solutions corresponding to True Shooter 1 708 are illustrated as $x_i$, while the solutions corresponding to True Shooter 2 718 are illustrated as $o_i$. As was the case with FIG. 6B, the location of the moving helicopter is depicted with triangles with the subscripts, i.e., $\Delta_1$, $\Delta_2$, and $\Delta_3$. Each received shockwave signal from each of the true shooters at a particular helicopter location will result in two ambiguous shooter locations—either two $x_i$ or two $o_i$ solutions. In determining these solutions, as described below in relation to FIGS. 9A and 9B, each of the received shockwave-only signals are associated with each of the true shooters. In some embodiments, this determination is made by computing a bullet caliber associated with each received shockwave-only signal. Additionally, or alternatively, a firing rate associated with each shooter may be computed, and this firing rate may be used to associate each received shockwave-only signal with each of the true shooters. The firing rate may be computed based at least in part on the frequency at which the sensors on the helicopter receive shockwave-only signals. Thus, the computed bullet caliber(s) and/or firing rate(s) provide a one-to-one mapping between the shooters and shockwave-only signals. Once such a mapping is provided, a set of ambiguous solutions may be computed, and an association between this set of solutions and one of the two shooters may be made. For instance, the shockwave plane propagating towards the helicopter $\Delta_1$ from True Shooter 1 708 results in the computation of two ambiguous solutions $x_1$, while the shockwave plane propagating towards the helicopter $\Delta_1$ from True Shooter 2 718 results in the computation of two ambiguous solutions $o_1$.

With continued reference to FIGS. 7A and 7B, the solutions for each true shooter's location group closer together because each true shooter does not physically move much during the burst of shots. For instance, cluster 730 contains ambiguous solutions $x_1$, $x_2$, and $x_3$ corresponding to True Shooter 1 708 that are close-spaced. Cluster 740 contains ambiguous solutions $o_1$, $o_2$, and $o_3$ corresponding to True Shooter 2 718 that are also close-spaced. In contrast, clusters 736 and 738 contain solutions that are spaced wider than clusters 730 and 740, respectively. These clusters enclose bogus shooter solutions that are spaced wider because both aircraft motion and weapon (e.g., rifle) slewing generally cause bogus shooter locations to appear to move around. For illustrative purposes, only four clusters of solutions are shown in FIG. 7B, however, those skilled in the art will appreciate that several more permissible clusters of ambiguous solutions may be determined. In one embodiment, a permissible cluster is one that corresponds to a set of ambiguous solutions associated with a particular shooter, and thus, a particular set of received shockwave-only signals. Thus, a cluster that contains a set of ambiguous solutions that are associated with two different shooters, e.g., two o and one x solution, are not permissible clusters.

In some embodiments, the expected angle between each of the true and each of the bogus shooter solution clusters may be used to determine which sets of ambiguous solutions are permissible. Depending on the Mach number for the bullet fired at the aircraft, the expected angle may be between 80 and 130 degrees, i.e., the angle between a cluster corresponding to the true shooter(s) and a cluster corresponding to the bogus shooter(s) is between approximately 80 and 130 degrees. In some embodiments, the expected shooter range(s) (based, e.g., on the bullet Mach number) may also be used to determine which sets of ambiguous solutions are permissible. For instance, if the expected shooter range for one of the shooters is 100 m, any clusters of ambiguous solutions corresponding to that shooter having a shooter range greater than 150 m or less than 50 m would not be a permissible cluster. In some embodiments, using a combination of the expected angles between the true and bogus solution clusters and/or the expected shooter ranges, at least four permissible clusters of ambiguous solutions may be determined—at least two corresponding to the true shooter locations and at least two corresponding to the bogus shooter locations.

For each shooter, the clusters of ambiguous solutions may be disambiguated by determining which cluster corresponds to the unambiguous solution for the shooter's location. Any suitable clustering algorithm may be used to make this determination and/or to find the sets of permissible clusters of ambiguous solutions. For instance, a clustering algorithm may be used to identify all permissible clusters of ambiguous solutions, as well as the cluster with the closest-spaced solutions. In one embodiment, the unambiguous shooter locations are selected to be the shooter locations associated with the sets of closest-spaced ambiguous solutions each true shooter's location. In some embodiments, a clustering algorithm may be used to find the mean distance between solutions in each cluster of solutions, and the center of the cluster with the smallest mean distance is determined to be a true shooter's location. Those skilled in the art will realize that many such computations of characteristics of a cluster may be performed, and many such rules may be used to determine which cluster corresponds to a true shooter's location. In one embodiment, the unambiguous shooter locations for each of True Shooter 1 708 and True Shooter 2 718 are selected to be the shooter locations associated with the sets of close-spaced clusters of ambiguous solutions, i.e., such clusters 730 and 740.

Figure 8A:
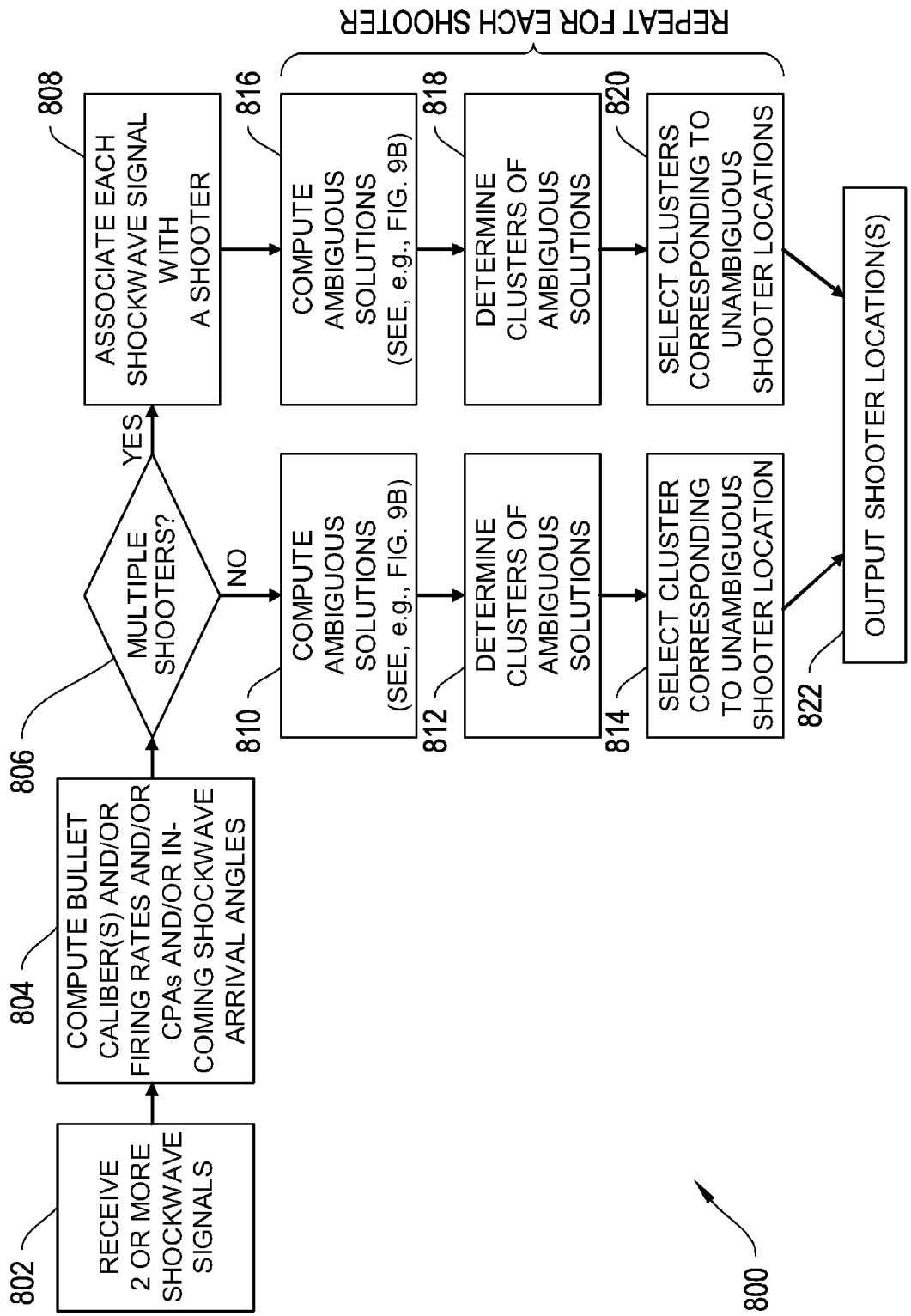
FIGS. 8A and 8B are flow diagrams for exemplary processes for determining the unambiguous shooter location, according to an illustrative embodiment.
Figure 8B:
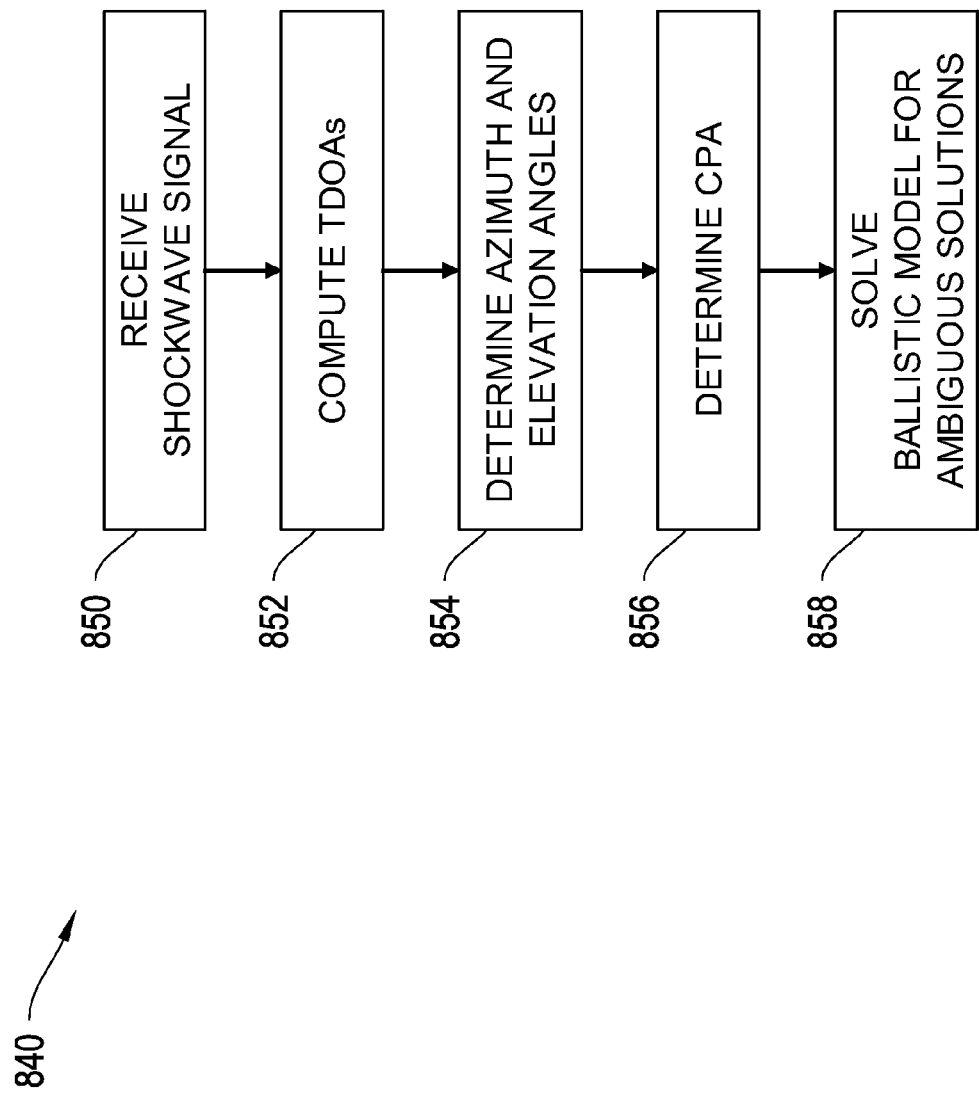

FIGS. 8A and 8B are flow diagrams for exemplary processes 800 and 840. Flow diagrams 800 and 840 relate to the systems and methods described herein for determining unambiguous shooter locations when multiple projectiles are fired at an aircraft by one or more shooters. Such determinations were discussed above in relation to FIGS. 6A and 7A. It will be understood that each step in flow diagrams 800 and 840 may be carried out by system 100 (FIG. 1) by executing instructions on location processor 104 (FIG. 1). Location processor 104 may be configured as a single or multi-processor system.

With continued reference to FIGS. 1, 8A and 8B, in one embodiment, location processor 104 receives two or more shockwave-only signals (802). Location processor 104 then computes bullet caliber(s) and/or firing rate(s) corresponding to the two or more shockwave-only signals (804). Location processor 104 may also compute the trajectory CPA and/or incoming shockwave arrival angle corresponding to the shockwave-only signals. In some embodiments, the computed bullet caliber(s) and/or firing rate(s) are used to determine if the shockwave signals correspond to a single shooter or to multiple shooters (806).

In some embodiments, at least two of the computed bullet caliber(s), the computed firing rate(s), the computed projectile CPA(s), and the computed incoming shockwave arrival angle(s), are used to determine if the shockwave signals correspond to a single shooter or to multiple shooters (806). In some embodiments, the incoming shockwave arrival angle is calculated from the shockwave-only TDOAs using a plane-wave beamformer. This beamformer computes a normal (N) wave for the incoming shockwave-only signal. Note that the beamformer processes the shockwave-only TDOAs orders of magnitude faster than the ambiguous solutions solver, which is described in step 910 below. The CPA and bullet caliber are estimated from the shock wave peak amplitude and from its slope. These estimates are based upon two theoretical observations: the slope of the N wave is independent of the bullet caliber and dependent only upon CPA and bullet Mach number, and the N wave amplitude depends upon CPA, caliber, and bullet Mach number. Furthermore, bullet Mach number relates to the CPA and the N wave amplitude in approximately the same manner, such that one could estimate CPA from the N wave slope and subsequently use the estimated CPA to estimate bullet caliber from the N wave amplitude.

In some embodiments, location processor 104 may compute a bullet caliber using at least one of the peak magnitude of the received shockwave-only signal, the duration of the initial portion of the received shockwave-only signal, and the magnitude of an initial portion of the received shockwave-only signal. For instance, the peak magnitude of the received shockwave-only signal may correspond to a particular bullet caliber, or the duration of the initial portion of the signal may correspond to a particular bullet caliber.

In some embodiments, firing rate is associated with a particular shooter by location processor 104 based at least in part on the known firing rates of assault weapons, e.g., sniper rifles and assault rifles. Some assault weapons have known maximum firing rates, known minimum firing rates, or known fixed firing rates. Location processor 104 may calculate the firing rate associated with a set of received shockwave-only signals by analyzing the set of received shockwave-only signals. For example, if the times of arrival of each received shockwave-only signal at sensors 102 correspond to regularly spaced intervals of time, then location processor 104 may determine that these shockwave-only signals correspond to a known firing rate of an assault weapon, and location processor 104 will determine that there is only one shooter associated with the received shockwave-only signals. Conversely, if the times of arrival of each received shockwave-only signal at sensors 102 correspond to irregularly spaced intervals of time, then location processor 104 may determine that these shockwave-only signals correspond to at least two different known firing rates of at least two different assault weapons. In this case, each received shockwave-only signal corresponding to the same shooter may be processed by the same processor within location processor 104.

Thus, location processor 104 determines if there is only one shooter, or if two or more shooters, corresponding to the received shockwave-only signals. In one embodiment, location processor 104 associates a shooter with each received shockwave-only signal using the computed parameters described above. For instance, if each received shockwave-only signal corresponds to a different bullet caliber and/or firing rate and/or trajectory CPAs and/or incoming shockwave arrival angles, then location processor 104 will determine that there are at least two different shooters associated with at least two different bullet calibers and/or firing rates and/or trajectory CPAs and/or incoming shockwave arrival angles.

If location processor 104 determines that there is only one shooter, then the sets of ambiguous solutions is computed for the received shockwave-only signals. Optionally, location processor 104 may be configured as a multiprocessor system such that the computations and determinations for each received shockwave-only signal are performed by a different processor. This computation may be performed using process 840 illustrated in FIG. 8B. In particular, location processor 104 may receive a shockwave signal (850) and analyze at least an initial portion of the received shockwave signal to compute TDOAs for each pair of sensors 102 that received the shockwave signal (852). Location processor 104 may then compute the azimuth and elevation angles of the shockwave plane approaching sensors 102 (854). These angles may be used to determine the projectile trajectory associated with the received shockwave-only signals. Location processor 104 then computes the closest point of approach (CPA) of the projectile trajectory associated with the TDOAs and the azimuth and elevation angles (856). In some embodiments, the CPA(s) computed at step 904 may be used in step 856. In some embodiments, the computed CPA may be the shortest distance from the shockwave plane's normal vector to the sensors 102.

The computed TDOAs, azimuth angle, elevation angle, CPA information may be used to solve the equations representing a ballistic model for the projectile trajectory and shooter location (858). The solution of such equations and a suitable ballistic model are described in U.S. Pat. No. 7,126,877. In some embodiments, a computational algorithm such as a gradient search method (e.g., Levenberg-Marquardt) may be used to solve for the projectile trajectory and shooter location. In some embodiments, the computation algorithm is a genetic algorithm that computes the solution(s) to the equations of a suitable ballistic model. In these embodiments, suitable ranges for the azimuth angle (e.g., computed azimuth angle plus a random angle with zero mean and 30 degree standard deviation), elevation angle (e.g., computed azimuth angle plus a random angle with zero mean and 30 degree standard deviation), CPA (e.g., computed CPA plus a random angle with zero mean and 10 degree standard deviation), projectile Mach number (e.g., evenly distributed between about 1.1 and about 2.6), and the angle of arrival (e.g., evenly distributed between 0 and 360 degrees) of the shockwave plane at the sensors 102 are used by the location processor 104 as inputs to or "seeds" for the genetic algorithm.

Once the sets of ambiguous solutions corresponding to the received shockwave-only signals is computed, location processor 104 determines clusters of ambiguous solutions (812). As described above in relation to FIG. 6B, clustering the ambiguous solutions may include determining sets of close- and wide-spaced ambiguous solutions for shooter location. Location processor 104 then determines which cluster corresponds to the unambiguous shooter location (814). In some embodiments, location processor 104 may use a clustering algorithm to find the mean distance between solutions in each such cluster of solutions for shooter location, and the centers of the cluster with the smallest mean distance is determined to be the true shooter locations. Those skilled in the art will appreciated that many clustering algorithms are known in the art and may be used to determine clusters of close- and wide-spaced ambiguous solutions, and to determine which cluster corresponds to an unambiguous shooter location.

On the other hand, if the location processor 104 determines that there is more than one shooter (806), then each received shockwave signal is first associated with a shooter (808). For each of these shooters, location processor 104 computes sets of ambiguous solutions corresponding to each of the received shockwave-only signals (816). Optionally, location processor 104 may be configured as a multiprocessor system such that the computations and determinations for each shooter are performed by a different processor. Alternatively, or additionally, location processor 104 may be configured as a multiprocessor system such that the computations and determinations for each received shockwave signal are performed by a different processor. This computation may be performed using process 840 illustrated in FIG. 8B as described above. Once the sets of ambiguous solutions corresponding to the received shockwave-only signals is computed, location processor 104 determines clusters of ambiguous solutions (818). As described above in relation to FIGS. 6B and 7B, clustering the sets of ambiguous solutions includes determining sets of ambiguous solutions for shooter location. Location processor 104 then determines which clusters corresponds to the unambiguous shooter locations (820).

After determining the unambiguous shooter location(s), location processor 104 outputs the unambiguous shooter location(s) corresponding to the one or more shooters on an output device. The output device may include at least one of a display, heads-up display (HUD), helmet display, intercom, radio and headset. The shooter location may be output in any audio-visual format, e.g., an audio message stating the shooter location(s), a visual message in the aircraft pilot's helmet display, etc.

Generally, the methods described herein may be executed on a conventional data processing platform such as an IBM PC-compatible computer running the Windows operating systems, a SUN workstation running a UNIX operating system or another equivalent personal computer or workstation. Alternatively, the data processing system may comprise a dedicated processing system that includes an embedded programmable data processing unit.

The methods described herein may also be realized as a software component operating on a conventional data processing system such as a UNIX workstation. In such an embodiment, the methods may be implemented as a computer program written in any of several languages well-known to those of ordinary skill in the art, such as (but not limited to) C, C++, FORTRAN, Java or BASIC. The methods may also be executed on commonly available clusters of processors, such as Western Scientific Linux clusters, which are able to allow parallel execution of all or some of the steps in the present process.

The method of the present invention may be performed in either hardware, software, or any combination thereof, as those terms are currently known in the art. In particular, the present method may be carried out by software, firmware, or microcode operating on a computer or computers of any type, including preexisting or already-installed avionics processing facilities capable of supporting any or all of the location processor's functions. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Accordingly, the systems and methods described herein are not limited to any particular platform, unless specifically stated otherwise in the present disclosure.

The invention may be embodied in other specific forms without departing from the spirit or essential characteristics thereof. The forgoing embodiments are therefore to be considered in all respects illustrative, rather than limiting of the invention.

The invention claimed is:

1. An airborne shooter detection system for determining a shooter location based on shockwave-only signals associated with a plurality of projectiles fired at an aircraft, comprising:

a plurality of sensors spaced apart on the surface of the body of the aircraft configured for receiving the shockwave-only signals, wherein the shockwave-only signals correspond to potentially ambiguous solutions for the shooter location;

at least one processor in communication with the plurality of sensors, the at least one processor configured for:
 analyzing the received shockwave-only signals;
 computing a set of ambiguous solutions for the shooter location;
 clustering the set of ambiguous solutions; and
 determining the unambiguous shooter location based on the clustering; and an output device in communication with the at least one processor for outputting the unambiguous shooter location.

2. The system of claim 1, wherein clustering the set of ambiguous solutions includes the at least one processor configured for determining a set of close-spaced ambiguous solutions and a set of wide-spaced ambiguous solutions.

3. The system of claim 2, wherein clustering the set of ambiguous solutions further includes the at least one processor configured for
 fitting a cluster around the set of close-spaced ambiguous solutions, wherein the close-spaced ambiguous solutions are associated with the unambiguous shooter location.

4. The system of claim 3, wherein fitting the cluster includes the at least one processor configured for selecting a center of the cluster for the set of close-spaced ambiguous solutions.

5. The system of claim 3, wherein the cluster is an ellipse.

6. The system of claim 3, wherein fitting the cluster includes determining a least-squares fit for the cluster enclosing the set of close-spaced ambiguous solutions.

7. The system of claim 3, comprising the at least one processor configured for selecting the center of the cluster as the unambiguous shooter location.

8. The system of claim 1, further comprising at least one processor configured for
 determining that at least two shooters are associated with the received shockwave-only signals;
 computing respective sets of ambiguous solutions for each respective shooter location; and
 determining at least two unambiguous shooter locations associated with each of the at least two shooters.

9. The system of claim 1, wherein computing the set of ambiguous solutions includes at least one processor configured for:
 computing time differences of arrival (TDOAs) from the initial portions of each received shockwave-only signal for each sensor pair of the plurality of sensors,
 determining an azimuth and an elevation for each respective incoming shockwave plane;
 determining a closest point of approach (CPA) for each respective projectile trajectory; and
 determining the set of ambiguous shooter locations based at least in part on the computed TDOAs, the azimuth and the elevation for the incoming shockwave plane, and the CPA for the respective projectile trajectory.

10. The system of claim 9, wherein determining the set of ambiguous shooter locations includes using a genetic algorithm.

11. The system of claim 10, wherein the genetic algorithm uses a set of values for at least three of the computed TDOAs, the azimuth and the elevation for the incoming shockwave plane, the CPA for the respective projectile trajectory, a projectile Mach number, and an angle between the CPA for the respective projectile trajectory and a normal to the respective shockwave plane.

12. An airborne shooter detection system for determining at least two shooter locations for at least two shooters based on shockwave-only signals associated with a plurality of projectiles fired at an aircraft, comprising:
 a plurality of sensors spaced apart on the surface of the body of the aircraft configured for receiving the shockwave-only signals, wherein the shockwave-only signals are indicative of potentially ambiguous solutions corresponding to the at least two shooter locations;
 at least one processor in communication with the plurality of sensors, the at least one processor configured for:
  determining at least two shooters are associated with the received shockwave-only signals;
  computing respective sets of ambiguous solutions for each respective shooter location;
  clustering the respective sets of ambiguous solutions; and
  determining at least two unambiguous shooter locations associated with the at least two shooters based on the clustering; and
 an output device in communication with the at least one processor for outputting the at least two unambiguous shooter locations.

13. The system of claim 12, wherein determining at least two shooters are associated with the received shockwave-only signals includes
 analyzing each received respective shockwave-only signal; and
 associating each received shockwave-only signal with each respective shooter of the at least two shooters.

14. The system of claim 12, wherein associating includes computing a characteristic associated with each respective shooter.

15. The system of claim 14, wherein the characteristic includes a first firing rate associated with a first of the at least two shooters, and a second firing rate associated with a second of the at least two shooters.

16. The system of claim 14, wherein the characteristic includes a first projectile caliber associated with a first of the at least two shooters, and a second projectile caliber associated with a second of the at least two shooters.

17. The system of claim 12, wherein the at least one processor comprises a plurality of processors.

18. The system of claim 17, wherein a first processor of the plurality of processors is configured for computing a set of ambiguous solutions for a first shooter location and a second processor of the plurality of processors is configured for computing a set of ambiguous solutions for a second shooter location.

19. The system of claim 12, wherein clustering the respective sets of ambiguous solutions includes the at least one processor configured for
 fitting clusters around respective sets of close-spaced ambiguous solutions, wherein the sets of close-spaced ambiguous solutions are associated with the unambiguous shooter locations.

20. The system of claim 12, wherein determining at least two unambiguous shooter locations associated with the at least two shooters includes at least one processor configured for:
 computing TDOA from the initial portions of each received shockwave-only signal for each sensor pair of the plurality of sensors;

determining an azimuth and an elevation for each respective incoming shockwave plane;

determining a closest point of approach (CPA) for each respective projectile trajectory;

computing at least one of firing rates and projectile calibers corresponding to the at least two shooters; and determining the unambiguous shooter locations for each of the at least two shooters based at least in part on the computed TDOA, the azimuth and the elevation for the incoming shockwave, the CPA for the respective projectile trajectory, and the at least one of the firing rates and the projectile calibers.

21. The system of claim 20, wherein determining the set of ambiguous shooter locations includes using a genetic algorithm.

22. The system of claim 21, wherein the genetic algorithm uses a set of values for at least three of the computed TDOA, the azimuth and the elevation for the incoming shockwave plane, the CPA for the respective projectile trajectory, a projectile Mach number, and an angle between the CPA for the respective projectile trajectory and a normal to the respective shockwave plane.

23. A method for determining a shooter location based on shockwave-only signals associated with a plurality of projectiles fired at an aircraft, comprising:

receiving the shockwave-only signals, wherein the shockwave-only signals correspond to potentially ambiguous solutions for the shooter location;

at least one processor analyzing the received shockwave-only signals;

the at least one processor computing a set of ambiguous solutions for the shooter location;

the at least one processor clustering the set of ambiguous solutions;

the at least one processor determining the unambiguous shooter location based on the clustering; and the at least one processor outputting the unambiguous shooter location to an output device.

24. The method of claim 23, wherein clustering the set of ambiguous solutions includes determining a set of close-spaced ambiguous solutions and a set of wide-spaced ambiguous solutions.

25. The method of claim 24, wherein clustering the set of ambiguous solutions further includes fitting a cluster around the set of close-spaced ambiguous solutions, wherein the close-spaced ambiguous solutions are associated with the unambiguous shooter location.

26. The method of claim 25, wherein fitting the cluster includes selecting a center of the cluster for the set of close-spaced ambiguous solutions.

27. The method of claim 25, wherein the cluster is an ellipse.

28. The method of claim 25, wherein fitting the cluster includes determining a least-squares fit for the cluster enclosing the set of close-spaced ambiguous solutions.

29. The method of claim 28, comprising selecting the center of the cluster as the unambiguous shooter location.

30. The method of claim 23, further comprising determining that at least two shooters are associated with the received shockwave-only signals;

computing respective sets of ambiguous solutions for each respective shooter location; and determining at least two unambiguous shooter locations associated with each of the at least two shooters.

31. The method of claim 23, wherein computing the set of ambiguous solutions includes computing time differences of arrival (TDOAs) from the initial portions of each received shockwave-only signal for each sensor pair of the plurality of sensors;

determining an azimuth and an elevation for each respective incoming shockwave plane;

determining a closest point of approach (CPA) for each respective projectile trajectory; and determining the set of ambiguous shooter locations based at least in part on the computed TDOAs, the azimuth and the elevation for the incoming shockwave plane, and the CPA for the respective projectile trajectory.

32. The method of claim 31, wherein determining the set of ambiguous shooter locations includes using a genetic algorithm.

33. The method of claim 32, wherein the genetic algorithm uses a set of values for at least three of the computed TDOAs, the azimuth and the elevation for the incoming shockwave plane, the CPA for the respective projectile trajectory, a projectile Mach number, and an angle between the CPA for the respective projectile trajectory and a normal to the respective shockwave plane.

34. A method for determining at least two shooter locations for at least two shooters based on shockwave-only signals associated with a plurality of projectiles fired at an aircraft, comprising:

at least one processor receiving the shockwave-only signals, wherein the shockwave-only signals correspond to potentially ambiguous solutions corresponding to the at least two shooter locations;

the at least one processor determining at least two shooters are associated with the received shockwave-only signals;

the at least one processor computing respective sets of ambiguous solutions for each respective shooter location;

the at least one processor clustering the respective sets of ambiguous solutions;

the at least one processor determining at least two unambiguous shooter locations associated with the at least two shooters based on the clustering; and the at least one processor outputting the at least two unambiguous shooter locations on an output device.

35. The method of claim 34, wherein determining at least two shooters are associated with the received shockwave-only signals includes the at least one processor analyzing each received respective shockwave-only signal; and the at least one processor associating each received shockwave-only signal with each respective shooter of the at least two shooters.

36. The method of claim 35, wherein associating includes the at least one processor computing a characteristic associated with each respective shooter.

37. The method of claim 36, wherein the characteristic includes a first firing rate associated with a first of the at least two shooters, and a second firing rate associated with a second of the at least two shooters.

38. The method of claim 36, wherein the characteristic includes a first projectile caliber associated with a first of the at least two shooters, and a second projectile caliber associated with a second of the at least two shooters.

39. The method of claim 34, wherein the at least one processor comprises a plurality of processors, and a first processor of the plurality of processors computes a set of ambiguous solutions for a first shooter location and a second processor of the plurality of processors computes a set of ambiguous solutions for a second shooter location.

40. The method of claim 34, wherein clustering the respective sets of ambiguous solutions includes the at least one processor fitting clusters around respective sets of close-spaced ambiguous solutions, wherein the sets of close-spaced ambiguous solutions are associated with the unambiguous shooter locations.

41. The method of claim 34, wherein determining at least two unambiguous shooter locations associated with the at least two shooters includes the at least one processor computing time differences of arrival (TDOAs) from the initial portions of each received shockwave-only signal for each sensor pair of the plurality of sensors;

the at least one processor determining an azimuth and an elevation for each respective incoming shockwave plane;

the at least one processor determining a closest point of approach (CPA) for each respective projectile trajectory;

the at least one processor computing at least one of firing rates and projectile calibers corresponding to the at least two shooters; and the at least one processor determining the unambiguous shooter locations for each of the at least two shooters based at least in part on the computed TDOAs, the azimuth and the elevation for the incoming shockwave, the CPA for the respective projectile trajectory, and the at least one of the firing rates and the projectile calibers.

42. The method of claim 34, wherein determining the set of ambiguous shooter locations includes using a genetic algorithm.

43. The method of claim 42, wherein the genetic algorithm uses a set of values for at least three of the computed TDOAs, the azimuth and the elevation for the incoming shockwave plane, the CPA for the respective projectile trajectory, a projectile Mach number, and an angle between the CPA for the respective projectile trajectory and a normal to the respective shockwave plane.

* * * * *